US012608327B2

(12) United States Patent
Lee et al.

(10) Patent No.: US 12,608,327 B2
(45) Date of Patent: Apr. 21, 2026

(54) SYSTEM-ON-CHIP AND AN INTERCONNECT BUS INCLUDED IN THE SYSTEM ON CHIP

(71) Applicant: SAMSUNG ELECTRONICS CO., LTD., Suwon-si (KR)

(72) Inventors: Byungtak Lee, Jeju-si (KR); Hee-Seong Lee, Siheung-si (KR); Myungkyoon Yim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/915,833

(22) Filed: Oct. 15, 2024

(65) Prior Publication Data

US 2025/0036588 A1     Jan. 30, 2025

Related U.S. Application Data

(63) Continuation of application No. 18/374,705, filed on Sep. 29, 2023, now Pat. No. 12,130,760, which is a continuation of application No. 17/686,501, filed on Mar. 4, 2022, now Pat. No. 11,775,463.

(30) Foreign Application Priority Data

Mar. 5, 2021     (KR) ........................ 10-2021-0029630

(51) Int. Cl.
*G06F 13/36*     (2006.01)
*G06F 13/362*    (2006.01)
*G06F 13/40*     (2006.01)

(52) U.S. Cl.
CPC ........ *G06F 13/362* (2013.01); *G06F 13/4027* (2013.01)

(58) Field of Classification Search
CPC ........................... G06F 13/362; G06F 13/4027
See application file for complete search history.

(56) References Cited

U.S. PATENT DOCUMENTS

| | | | |
|---|---|---|---|
| 9,235,727 | B2 | 1/2016 | Thomas et al. |
| 9,725,054 | B2 | 8/2017 | Rupp et al. |
| 9,984,009 | B2 | 5/2018 | Ahmed et al. |
| 10,482,289 | B2 | 11/2019 | Barr et al. |
| 11,392,455 | B1 | 7/2022 | Langadi |

(Continued)

*Primary Examiner* — Henry Tsai
*Assistant Examiner* — Christopher A Daley
(74) *Attorney, Agent, or Firm* — Morgan, Lewis & Bockius LLP

(57) ABSTRACT

A system-on-chip including: a first slave having a first safety level; a second slave having a second safety level; a first master having a third safety level, the first master outputs a first access request for the first slave and a second access request for the second slave; a safety function protection controller that outputs first attribute information corresponding to the first safety level, second attribute information corresponding to the second safety level, and third attribute information corresponding to the third safety level; and an interconnect bus that receives the first, second and third attribute information, transfers the first access request to the first slave when it is determined that the third safety level is higher than or equal to the first safety level, and blocks the second access request when it is determined that the third safety level is lower than the second safety level.

20 Claims, 15 Drawing Sheets

(56)  References Cited

U.S. PATENT DOCUMENTS

| | | | | |
|---|---|---|---|---|
| 11,775,463 B2 * | 10/2023 | Lee | ..................... | G06F 13/4217 |
| | | | | 710/110 |
| 12,130,760 B2 * | 10/2024 | Lee | ..................... | G06F 13/4217 |
| 2012/0124260 A1 * | 5/2012 | Kothamasu | ........... | G06F 13/362 |
| | | | | 710/110 |
| 2014/0143463 A1 | 5/2014 | Mou et al. | | |
| 2014/0223052 A1 * | 8/2014 | Chavali | .............. | G06F 13/4221 |
| | | | | 710/110 |
| 2015/0057908 A1 | 2/2015 | Carbonaro et al. | | |
| 2015/0242233 A1 | 8/2015 | Brewerton et al. | | |
| 2016/0080376 A1 | 3/2016 | Temple et al. | | |
| 2016/0259744 A1 | 9/2016 | Kim | | |
| 2016/0292107 A1 | 10/2016 | Kim | | |
| 2018/0107615 A1 | 4/2018 | Egi | | |
| 2018/0307635 A1 | 10/2018 | Rota | | |
| 2018/0307845 A1 * | 10/2018 | Eckhardt | ................. | G06F 21/53 |
| 2019/0065785 A1 | 2/2019 | Barr et al. | | |
| 2019/0102332 A1 | 4/2019 | Cho et al. | | |
| 2019/0171538 A1 | 6/2019 | Gulati et al. | | |
| 2019/0228160 A1 | 7/2019 | Hunsaker et al. | | |
| 2019/0379573 A1 | 12/2019 | Pontes et al. | | |
| 2020/0272589 A1 | 8/2020 | Rennig et al. | | |
| 2020/0319926 A1 | 10/2020 | Lamour et al. | | |
| 2022/0283971 A1 | 9/2022 | Lee et al. | | |
| 2022/0303053 A1 * | 9/2022 | Hellwig | ................ | H04L 1/0045 |
| 2024/0020254 A1 | 1/2024 | Lee et al. | | |

* cited by examiner

Master Device [QM] | Master Device [ASIL-B] | Interconnect Bus | Safety MPU | Slave Device [ASIL-A]

TR1 for slave[ASIL-A] (S310)

Error (S311)

TR2 for slave[ASIL-A] (S320)

TR2 (S321)

S322

Error (S323)

No

ASIL_s ≥ ASIL_t

Yes

TR2 (S324)

S325

Perform operation corresponding to TR2

SYSTEM-ON-CHIP AND AN INTERCONNECT BUS INCLUDED IN THE SYSTEM ON CHIP

CROSS-REFERENCE TO RELATED APPLICATIONS

This application is a continuation of U.S. patent application Ser. No. 18/374,705 filed on Sep. 29, 2023, which is a continuation of U.S. patent application Ser. No. 17/686,501 filed on Mar. 4, 2022, now. U.S. Pat. No. 11,775,463, which claims priority under 35 U.S.C. § 119 to Korean Patent Application No. 10-2021-0029630 filed on Mar. 5, 2021, in the Korean Intellectual Property Office, the disclosures of which are incorporated by reference herein in their entireties.

TECHNICAL FIELD

Embodiments of the present disclosure relate to a semiconductor device, and more particularly, to a system-on-chip configured to selectively block a transaction between devices based on a safety level of the devices and an interconnect bus included in the system-on-chip.

DISCUSSION OF RELATED ART

In the automotive industry, various devices or systems for enhancing the driving experience of a user are being developed. For example, an automotive electronic system provides autonomous driving or various user enhancements such as infotainment. The automotive electronic system may employ a semiconductor integrated circuit to provide these driving add-ons.

When an error occurs in the automotive electronic system, user safety may be compromised. As such, the ISO 26262 standard defines an automotive safety integrity level (ASIL) for various hardware devices or IP blocks that are used in the automotive electronic system. In compliance with ASIL defined by the ISO 26262 standard, the hardware devices or IP blocks may operate or may communicate with each other. However, in some instances, an unintended communication may be made between hardware devices or IP blocks. As such, the safety of a motorist may be jeopardized.

SUMMARY

Embodiments of the present disclosure provide a system-on-chip configured to selectively block a transaction between devices based on a safety level of the devices and an interconnect bus included in the system-on-chip.

According to an embodiment of the present disclosure, there is provided a system-on-chip including: a first slave device having a first safety level; a second slave device having a second safety level; a first master device having a third safety level, wherein the first master device is configured to output a first access request for the first slave device and a second access request for the second slave device; a safety function protection controller configured to output first attribute information corresponding to the first safety level, second attribute information corresponding to the second safety level, and third attribute information corresponding to the third safety level; and an interconnect bus configured to receive the first, second and third attribute information, to transfer the first access request to the first slave device when it is determined based on the first and third attribute information that the third safety level is higher than or equal to the first safety level, and to block the second access request when it is determined based on the second and third attribute information that the third safety level is lower than the second safety level.

According to an embodiment of the present disclosure, there is provided a system-on-chip including: an interconnect bus; a master device configured to communicate with the interconnect bus through a first master interface; a slave device configured to communicate with the interconnect bus through a slave interface; and a safety function protection controller configured to output master attribute information corresponding to a safety level of the master device through the first master interface, and to provide slave attribute information corresponding to a safety level of the slave device to the interconnect bus through a second master interface, wherein the interconnect bus is configured to: receive the master attribute information from the safety function protection controller through the first master interface; receive an access request for the slave device from the master device through the first master interface; receive the slave attribute information through the second master interface; and selectively block the access request based on the master attribute information and the slave attribute information.

According to an embodiment of the present disclosure, there is provided an interconnect bus included in a system-on-chip including: a first master interface configured to communicate with a master device having a first safety level; a first slave interface configured to communicate with a slave device having a second safety level; and a bus control block configured to receive an access request for the slave device from the master device through the first master interface and to block the access request when the first safety level is lower than the second safety level.

BRIEF DESCRIPTION OF THE FIGURES

The above and other features of the present disclosure will become apparent by describing in detail embodiments thereof with reference to the accompanying drawings.

DETAILED DESCRIPTION OF THE EMBODIMENTS

Below, embodiments of the present disclosure may be described in detail and clearly to such an extent that one skilled in the art easily may carry out the present disclosure.

Figure 1:
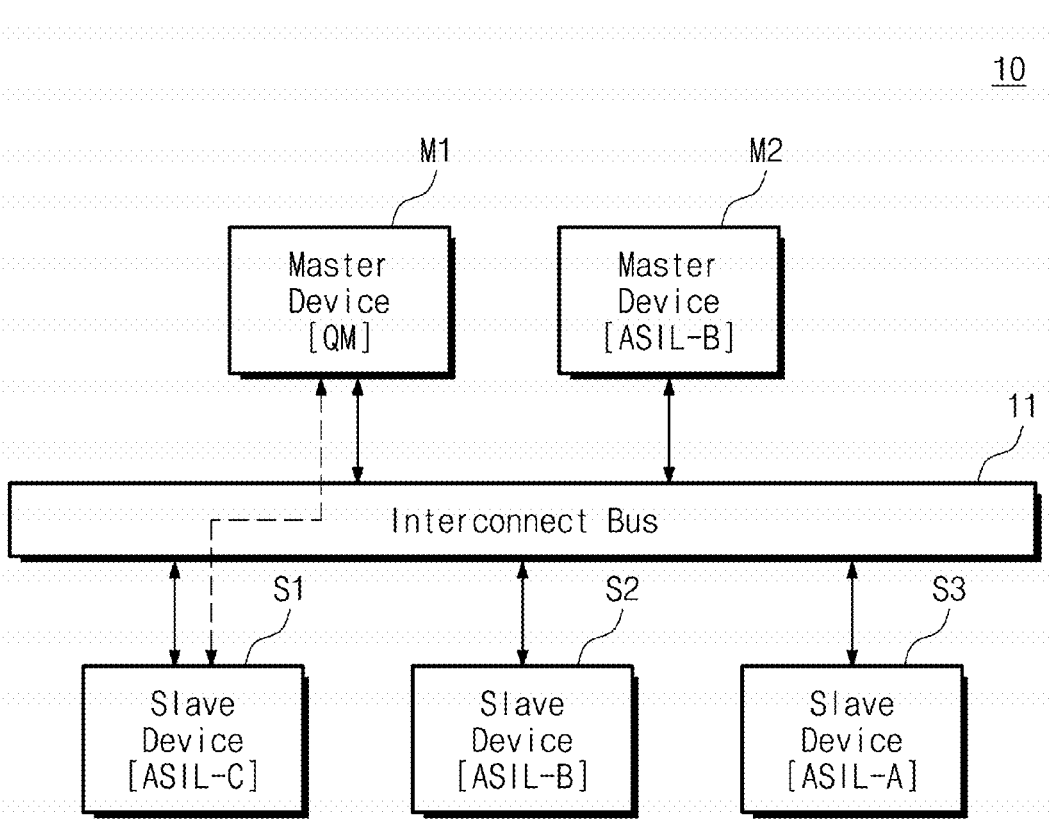
FIG. 1 is a block diagram illustrating a system-on-chip.

FIG. 1 is a block diagram illustrating a system-on-chip. Referring to FIG. 1, a system-on-chip (SoC) 10 may include a plurality of master devices M1 and M2, a plurality of slave devices S1, S2, and S3, and an interconnect bus 11. The system-on-chip 10 may be an application processor that is used in various systems. The various systems may include portable computing systems such as a smartphone, a tablet personal computer (PC), and a laptop, or an automotive electronic system such as an electric vehicle and an autonomous vehicle.

The plurality of master devices M1 and M2 and the plurality of slave devices S1, S2, and S3 may include various hardware blocks or various software blocks, which operate in the system-on-chip 10, or a combination thereof. In an embodiment of the present disclosure, each of the plurality of master devices M1 and M2 and the plurality of slave devices S1, S2, and S3 may be a software intellectual property (IP) block, a firmware IP block, or a hardware IP block configured to perform a specific function.

The plurality of master devices M1 and M2 and the plurality of slave devices S1, S2, and S3 may communicate with each other through the interconnect bus 11. In an embodiment of the present disclosure, the interconnect bus 11 may be a system bus based on an Advanced eXtensible Interface (AXI) protocol. Below, it is assumed that an interconnect bus is based on the AXI protocol. However, the present disclosure is not limited thereto. For example, the interconnect bus may be based on various communication buses. For example, the interconnect bus 11 may include an interconnect bus of an Advanced Microcontroller Bus Architecture (AMBA) such as an Advance High Performance Bus (AHB), an Advanced System Bus (ASB), or an Advanced Peripheral Bus (APB) or various other kinds of interconnect buses.

In an embodiment of the present disclosure, the system-on-chip 10 may be an application processor included in an automotive electronic system. In this case, each of the plurality of master devices M1 and M2 and the plurality of slave devices S1, S2, and S3 included in the system-on-chip 10 may have an automotive safety integrity level (ASIL) defined by the ISO 26262 standard. Table 1 below shows automotive safety integrity levels ASIL defined by the ISO 26262 standard.

TABLE 1

| ASIL Definition | | C1 | C2 | C3 |
|---|---|---|---|---|
| S1 | E1 | QM | QM | QM |
|  | E2 | QM | QM | QM |
|  | E3 | QM | QM | A |
|  | E4 | QM | A | B |
| S2 | E1 | QM | QM | QM |
|  | E2 | QM | QM | A |
|  | E3 | QM | A | B |
|  | E4 | A | B | C |
| S3 | E1 | QM | QM | A |
|  | E2 | QM | A | B |

TABLE 1-continued

| ASIL Definition | | C1 | C2 | C3 |
|---|---|---|---|---|
|  | E3 | A | B | C |
|  | E4 | B | C | D |

Referring to Table 1 above, automotive safety integrity levels ASIL may be determined depending on levels of S1, S2 and S3, E1, E2, E3 and E4, and C1, C2 and C3. Severity(S) defines the seriousness or intensity of the damage or consequences to the life of people (e.g., passengers and road users) and property due to safety goal infringement. The order of severity is as follows: S1 for light and moderate injuries; S2 for severe and life-threatening injuries; and S3 for life-threatening. Exposure (E) is the measure of the possibilities of the vehicle being in a hazardous or risky situation that can cause harm to people and property. Various levels of exposure such as E1: very low probability, E2: low probability, E3: medium probability; and E4: high probability may be assigned to the automotive component being evaluated. Controllability (C) determines the extent to which the driver of the vehicle can control the vehicle if a safety goal is breached due to failure or malfunctioning of any automotive component being evaluated. The order of controllability is defined as: C1<C2<C3 (C1 for easy to control while C3 for difficult to control). The automotive safety integrity level ASIL may be classified as a QM level, an A level, a B level, a C level, or a D level. QM indicates a rating irrelevant to function safety. The automotive safety integrity level ASIL may indicate a high rating in the order of A, B, C, and D. As the automotive safety integrity level ASIL becomes higher, the level of danger due to an abnormal operation may become higher. In other words, as the automotive safety integrity level ASIL becomes higher, requirements for the safety may become higher.

Below, embodiments of the present disclosure will be based on the automotive safety integrity level ASIL defined by the ISO 26262 standard, but the present disclosure is not limited thereto. For example, the present disclosure may use a safety level defined by the IEC 61508 standard which is the Functional Safety of Electrical/Electronic/Programmable Electronic Safety-related Systems (E/E/PE, or E/E/PES), or the safety level set forth by various other industries (e.g., railroad, port, aviation, telecommunications, etc.) may be applied thereto.

In the example of FIG. 1, the first master device M1 may have the QM level, and the second master device M2 may have the ASIL-B level. The first slave device S1 may have the ASIL-C level, the second slave device S2 may have the ASIL-B level, and the third slave device S3 may have the ASIL-A level.

In an embodiment of the present disclosure, the first master device M1 having the QM level may request an access to the first slave device S1 having the ASIL-C level. In other words, a master device having a relatively low safety level may access a slave device having a relatively high safety level. However, because data or an operation timing for a slave device having a relatively high safety level is changed due to this access, the first slave device S1 may abnormally operate. In other words, the above access may occur due to interference in the system-on-chip 10, thereby causing an abnormal operation of the system-on-chip 10.

Figure 2:
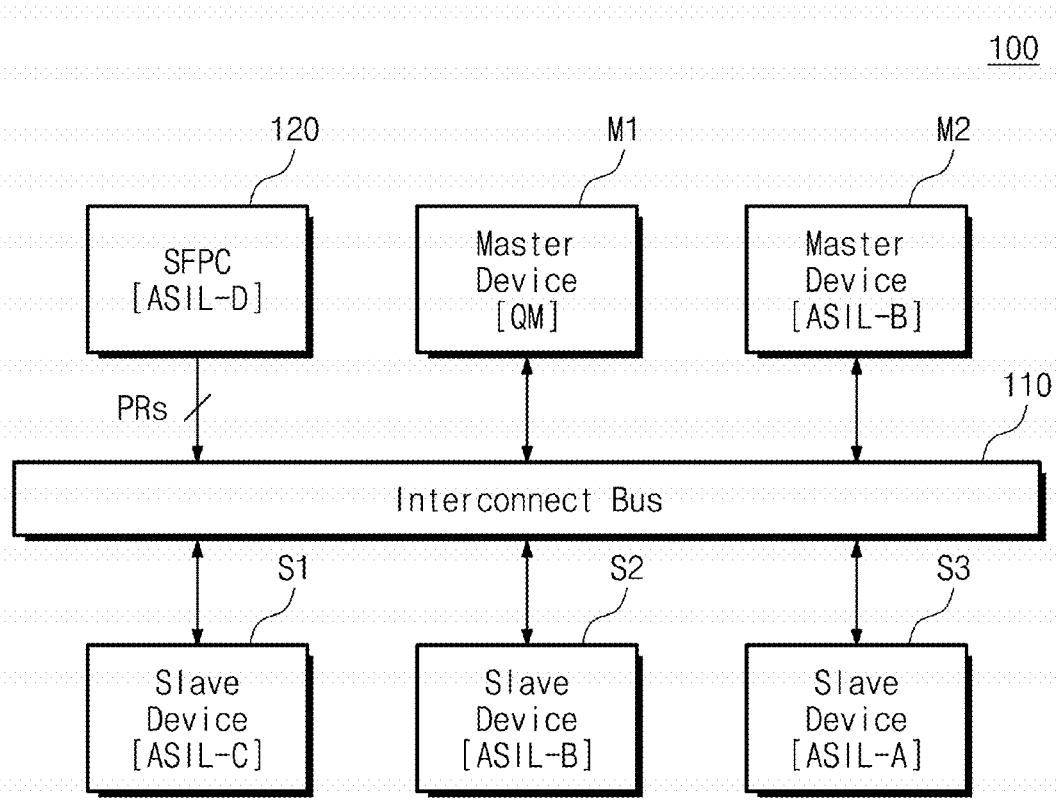
FIG. 2 is a block diagram illustrating a system-on-chip according to an embodiment of the present disclosure.

FIG. 2 is a block diagram illustrating a system-on-chip according to an embodiment of the present disclosure. Referring to FIG. 2, a system-on-chip 100 may include the plurality of master devices M1 and M2, the plurality of slave devices S1, S2, and S3, an interconnect bus 110, and a safety function protection controller (SFPC) 120.

The plurality of master devices M1 and M2 and the plurality of slave devices S1, S2, and S3 are described above, and thus, additional description will be omitted to avoid redundancy.

The SFPC 120 may provide attribute information PRs about safety levels of the plurality of master devices M1 and M2 and the plurality of slave devices S1, S2, and S3 to the interconnect bus 110.

The interconnect bus 110 may be connected with the plurality of master devices M1 and M2 and the plurality of slave devices S1, S2, and S3. The interconnect bus 110 may be configured to control the communication between the plurality of master devices M1 and M2 and the plurality of slave devices S1, S2, and S3. In an embodiment of the present disclosure, the interconnect bus 110 may be a system bus that is based on the AXI protocol, but the present disclosure is not limited thereto.

The interconnect bus 110 may control an access from each of the plurality of master devices M1 and M2, based on the automotive safety integrity level ASIL (hereinafter referred to as a "safety level") of each of the plurality of master devices M1 and M2 and the plurality of slave devices S1, S2, and S3.

The interconnect bus 110 may control an access, based on attribute information corresponding to a master device requesting an access and attribute information corresponding to a slave device for which the access is requested. For example, when a safety level corresponding to the attribute information of the master device is lower than a safety level corresponding to the attribute information of the slave device, the interconnect bus 110 may block an access from the master device to the slave device. Disturbance of safety levels may be prevented through the above operation of the interconnect bus 110. In other words, freedom from interference (FFI) in the system-on-chip 100 may be accomplished.

As a more detailed example, the first master device M1 or the second master device M2 may request an access to the first slave device S1. In this case, a safety level of the first master device M1 may be QM, a safety level of the second master device M2 may be ASIL-B, and a safety level of the first slave device S1 may be ASIL-C. In other words, the safety level of each of the first and second master devices M1 and M2 is lower than the safety level of the first slave device S1. In this case, the interconnect bus 110 may identify safety levels of the first and second master devices M1 and M2 and the first slave device S1, based on the attribute information PRs from the SFPC 120. The interconnect bus 110 may block an access to the first slave device S1 having a relatively high safety level from the first and second master devices M1 and M2 having a relatively low safety level, based on the identified safety levels.

In contrast, the second master device M2 may access the third slave device S3. In this case, the safety level of the second master device M2 may be ASIL-B, and a safety level of the third slave device S3 may be ASIL-A. In this case, as in the above description, the interconnect bus 110 may identify safety levels of the second master device M2 and the third slave device S3, based on the attribute information PRs from the SFPC 120. In this case, however, because the safety level of the second master device M2 is higher than the safety level of the third slave device S3, the interconnect bus 110 may allow an access from the second master device M2 to the third slave device S3.

In an embodiment of the present disclosure, the attribute information PRs from the SFPC 120 may be provided in various ways, and configurations associated with various ways will be described in more detail with reference to the accompanying drawings. In an embodiment of the present disclosure, the SFPC 120 among IP blocks included in the system-on-chip 100 may be configured to have the highest safety level. In an embodiment of the present disclosure, the SFPC 120 may be configured to have the highest level (e.g., ASIL-D) of automotive safety integrity levels ASIL defined by the ISO 26262 standard.

Figure 3:
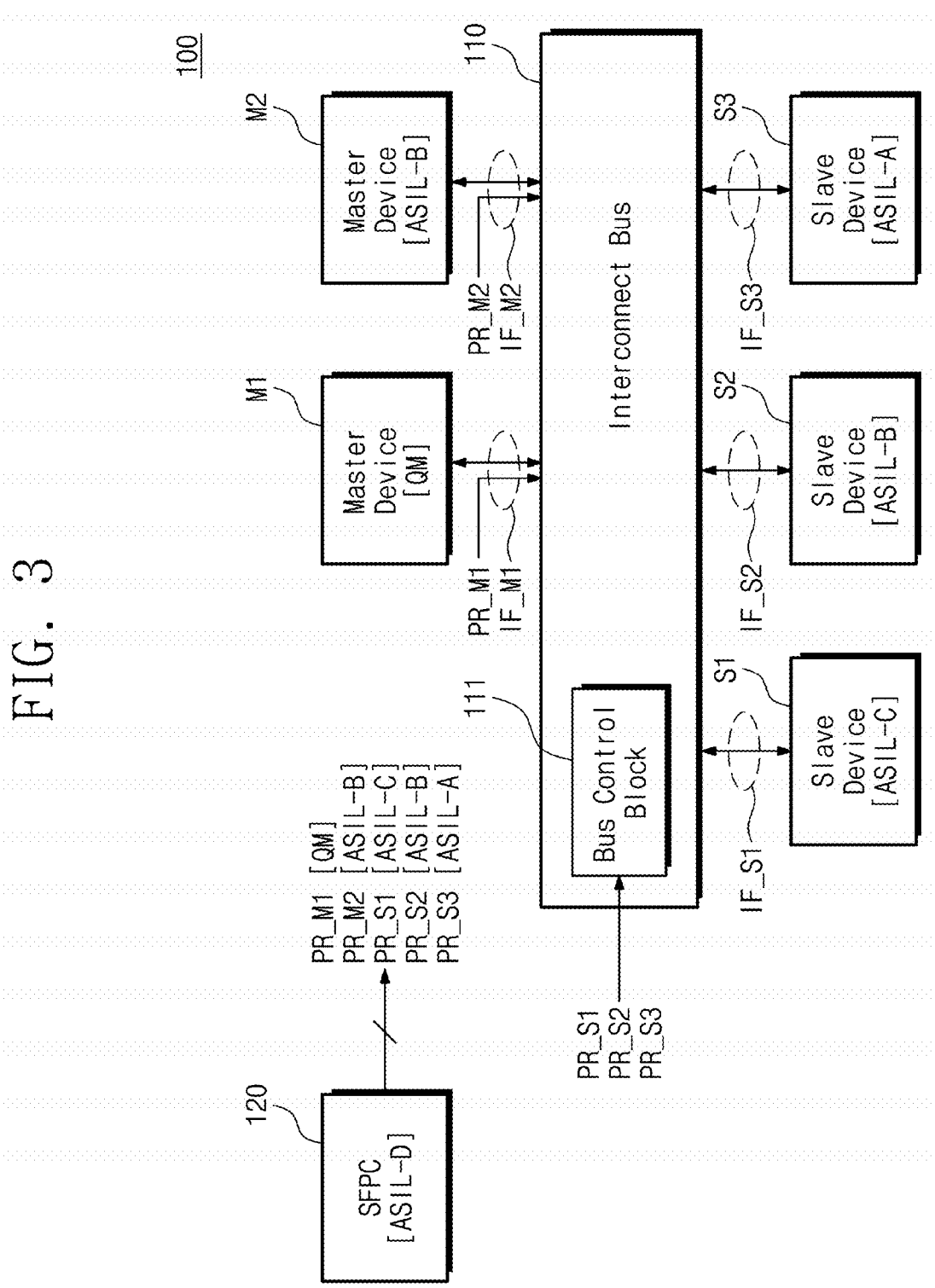
FIG. 3 is a block diagram illustrating a system-on-chip of FIG. 2 in more detail.

FIG. 3 is a block diagram illustrating a system-on-chip of FIG. 2 in more detail. Referring to FIGS. 2 and 3, the system-on-chip 100 may include the plurality of master devices M1 and M2, the plurality of slave devices S1, S2, and S3, the interconnect bus 110, and the SFPC 120. The plurality of master devices M1 and M2 and the plurality of slave devices S1, S2, and S3 have the safety levels described with reference to FIGS. 1 and 2, and thus, additional description will be omitted to avoid redundancy.

The interconnect bus 110 may include a bus control block 111. The bus control block 111 may control or manage a requested access, based on the safety level (or corresponding attribute information) of each of the plurality of master devices M1 and M2 and the plurality of slave devices S1, S2, and S3. For example, as described with reference to FIG. 2, the bus control block 111 may be configured to block a request for an access to a slave device having a relatively high safety level from a master device having a relatively low safety level.

In an embodiment of the present disclosure, the bus control block 111 may receive attribute information PR_S1, PR_S2, and PR_S3 respectively indicating the safety levels of the plurality of slave devices S1, S2, and S3 from the SFPC 120 and may receive attribute information PR_M1 and PR_M2 respectively indicating the safety levels of the plurality of master devices M1 and M2 through corresponding master interfaces.

For example, the interconnect bus 110 may be connected with the plurality of master devices M1 and M2 through the master interfaces and may be connected with the plurality of slave devices S1, S2, and S3 through slave interfaces. One master interface may refer to communication channels or physical signal lines connected with one master device, or circuit blocks for processing signals. The first master device M1 may be connected with the interconnect bus 110 through a first master interface IF_M1. The second master device M2 may be connected with the interconnect bus 110 through a second master interface IF_M2.

The SFPC 120 may transmit the first master attribute information PR_M1 corresponding to the first master device M1 to the interconnect bus 110 through the first master interface IF_M1. For example, the SFPC 120 may transmit the first master attribute information PR_M1 corresponding to the first master device M1 to the interconnect bus 110 as an AxUSER signal (or a signal line) of the first master interface IF_M1.

Likewise, the SFPC 120 may transmit the second master attribute information PR_M2 corresponding to the second master device M2 to the interconnect bus 110 through the second master interface IF_M2. For example, the SFPC 120 may transmit the second master attribute information PR_M2 corresponding to the second master device M2 to the interconnect bus 110 as an AxUSER signal (or a signal line) of the second master interface IF_M2.

The bus control block 111 of the interconnect bus 110 may receive the first master attribute information PR_M1 through the first master interface IF_M1 and may receive the second master attribute information PR_M2 through the second master interface IF_M2. The bus control block 111 may receive the plurality of slave attribute information PR_S1, PR_S2, and PR_S3 respectively associated with the plurality of slave devices S1, S2, and S3 from the SFPC 120. The bus control block 111 may perform the above access control operation or the above access blocking operation, based on received attribute information.

Figure 4:
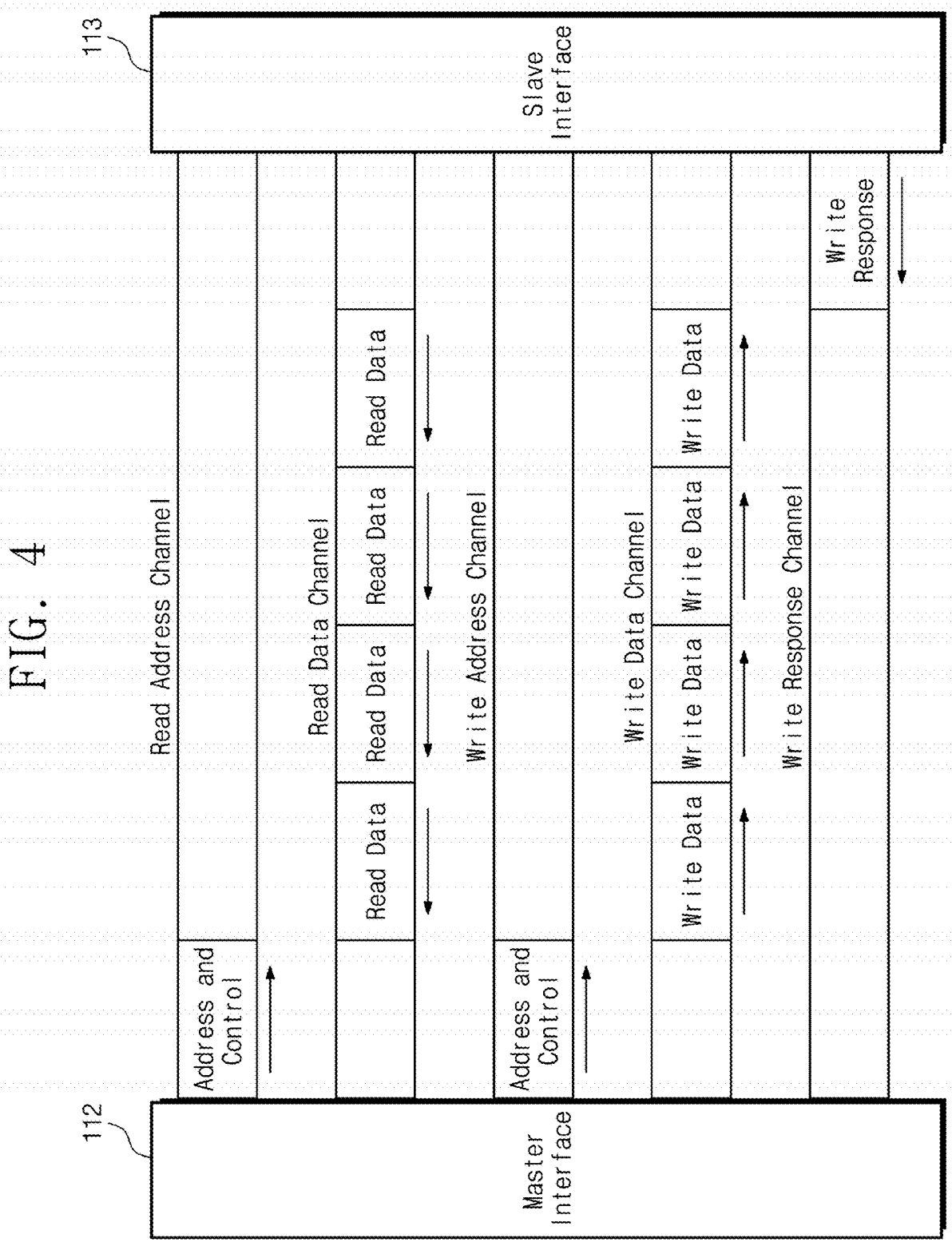
FIG. 4 is a diagram for describing an example of a channel structure in an interconnect bus of FIG. 3.

FIG. 4 is a diagram for describing an example of a channel structure in an interconnect bus of FIG. 3. For convenience of description, it is assumed that the interconnect bus 110 is a bus based on the AXI protocol. However, the present disclosure is not limited thereto. The channel structure illustrated in FIG. 4 shows communication between a master device and a slave device through the interconnect bus 110 in FIG. 3.

Referring to FIGS. 3 and 4, the interconnect bus 110 may include a master interface 112 and a slave interface 113. The master interface 112 may be connected with at least one of the plurality of master devices M1 and M2. The slave interface 113 may be connected with at least one of the plurality of slave devices S1, S2, and S3. The master interface 112 may correspond to at least one of the plurality of master interfaces IF_M1 and IF_M2 described with reference to FIG. 3, and the slave interface 113 may correspond to at least one of the plurality of slave interfaces IF_S1, IF_S2, and IF_S3 described with reference to FIG. 3.

The plurality of master devices M1 and M2 and the plurality of slave devices S1, S2, and S3 may communicate with each other through the master interface 112 and the slave interface 113 of the interconnect bus 110.

For example, the master interface 112 and the slave interface 113 may configure a read address channel, a read data channel, a write address channel, a write data channel, and a write response channel.

When one (e.g., referred to as a "second master device M2") of the plurality of master devices M1 and M2 performs a read access to one (e.g., referred to as a "third slave device S3") of the plurality of slave devices S1, S2, and S3, the second master device M2 may transmit an address and a control signal to the third slave device S3 through the read address channel, and the third slave device S3 may transmit read data to the second master device M2 through the read data channel.

When one (e.g., referred to as a "second master device M2") of the plurality of master devices M1 and M2 performs a write access to one (e.g., referred to as a "third slave device S3") of the plurality of slave devices S1, S2, and S3, the second master device M2 may transmit an address and a control signal to the third slave device S3 through the write address channel, the second master device M2 may transmit write data to the third slave device S3 through the write data channel, and the third slave device S3 may transmit a write response to the second master device M2 through the write response channel.

Figure 5:
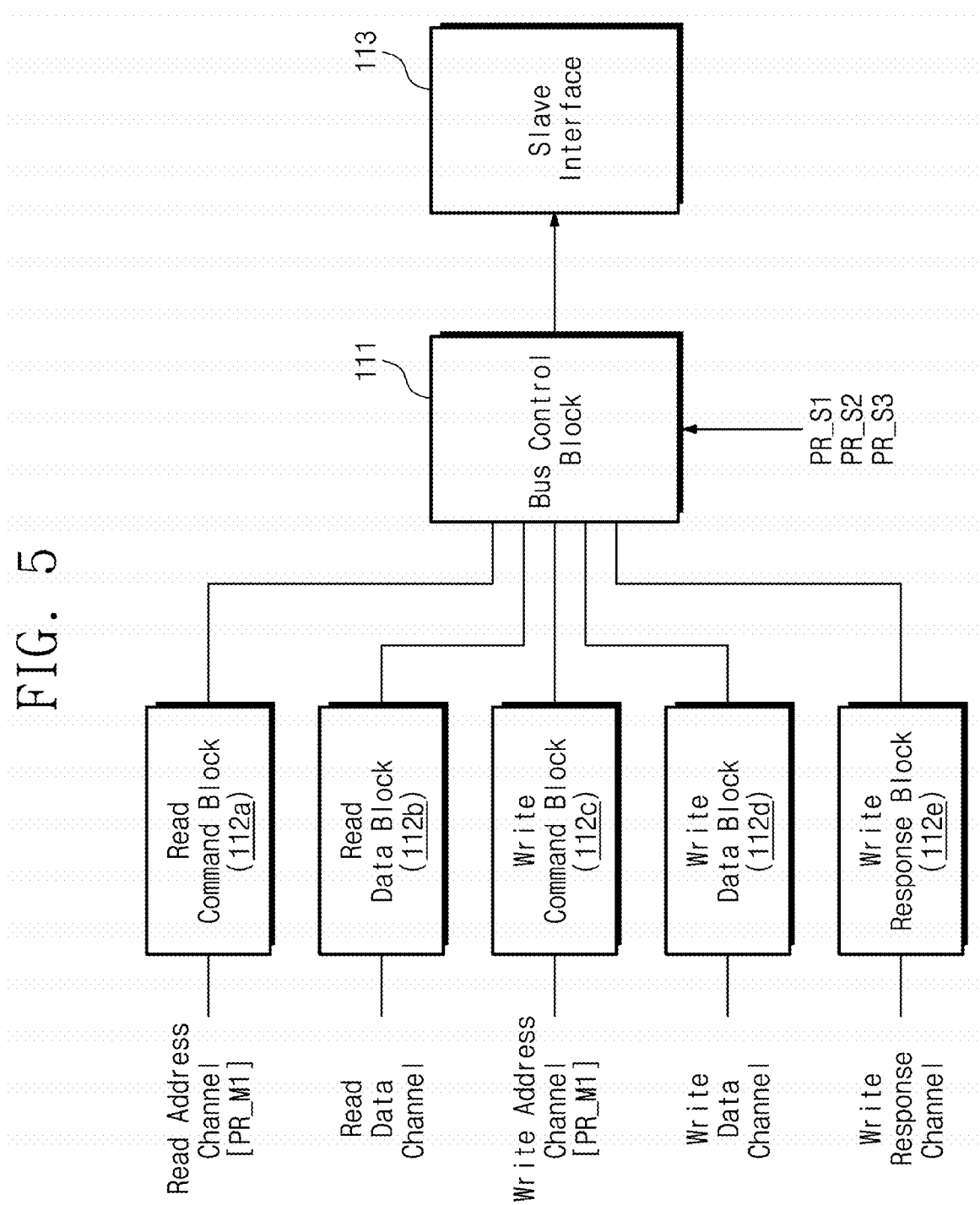
FIG. 5 is a diagram for describing an operation of a bus control block of FIG. 3.

FIG. 5 is a diagram for describing an operation of a bus control block of FIG. 3. For convenience of description, an additional description associated with the components described above will be omitted to avoid redundancy. Referring to FIGS. 3 to 5, the interconnect bus 110 may include the bus control block 111, the master interface 112, and the slave interface 113. The bus control block 111 may be configured to control communication between the master interface 112 and the slave interface 113 (e.g., to selectively block or allow an access), based on attribute information about a safety level of each of master devices and slave devices.

The master interface 112 may include a read command block 112a, a read data block 112b, a write command block 112c, a write data block 112d, and a write response block 112e.

The read command block 112a may be configured to process signals corresponding to the read address channel or may be configured to manage the read address channel. Signals to be processed by the read command block 112a or signals corresponding to the read address channel may include signals such as ARID: a read transaction identifier, ARADDR: a read address, ARLEN: a burst length, ARSIZE: a burst size, ARBURST: a burst type, ARLOCK: information about an atomic characteristic of a read transaction, ARCACHE: a cache type, ARPROT: attributes of a read transaction (e.g., an access type, a security level, and a characteristic), ARQOS: a quality of service (QOS) of a read transaction, ARREGION: a region indicator of a read transaction, ARVALID: an indicator about validity of a signal of the read address channel, and ARREADY: an indicator about completion of transmission for the read address channel. In other words, the read command block 112a may receive a read address and read control signals from a corresponding master device through the read address channel.

The read data block 112b may be configured to process signals corresponding to the read data channel or may be configured to manage the read data channel. Signals to be processed by the read data block 112b or signals corresponding to the read data channel may include signals such as RID: an identifier about read data and a response, RDATA: read data, RRESP: a read response, RLAST: an indicator notifying the last data of a read transmission, RVAILD: an indicator about validity of a signal of the read data channel, RREADY: an indicator about completion of transmission for the read data channel. In other words, the read data block 112b may transmit read data to a corresponding master device through the read data channel.

The write command block 112c may be configured to process signals corresponding to the write address channel or may be configured to manage the write address channel. Signals processed by the write command block 112c or signals corresponding to the write address channel may include signals such as AWID: a write transaction identifier, AWADDR: a write address, ARLEN: a burst length, ARSIZE: a burst size, ARBURST: a burst type, AWLOCK: information about an atomic characteristic of a write transaction, AWCACHE: a cache type, AWPROT: attributes of a write transaction, AWQOS: a quality of service (QOS) of a write transaction (e.g., an access type, a security level, and a characteristic), AWREGION: a region indicator of a write transaction, AWVALID: an indicator about validity of a signal of the write address channel, and AWREADY: an indicator about completion of transmission for the write address channel. In other words, the write command block 112c may receive a write address and write control signals from a corresponding master device through the write address channel.

The write data block 112d may be configured to process signals corresponding to the write data channel or may be configured to manage the write data channel. Signals to be processed by the write data block 112d or signals corresponding to the write data channel may include signals such as WID: an identifier about write data, WDATA: write data, WSTRB: a write strobe, WLAST: an indicator notifying the last data of a write transaction, WVALID: an indicator about validity of a signal of the write data channel, WREADY: an indicator about completion of transmission for the write data channel. In other words, the write data block 112d may receive write data from a corresponding master device through the write data channel.

The write response block 112e may be configured to process signals corresponding to the write response channel or may be configured to manage the write response channel. Signals to be processed by the write response block 112e or signals corresponding to the write response channel may include signals such as a BID: write response identifier, BRESP: a write response, BVALID: an indicator about validity of a signal of the write response channel, and BREADY: an indicator about completion of transmission for the write response channel. In other words, the write response block 112e may transmit a write response to a corresponding master device through the write response channel.

In an embodiment of the present disclosure, the signals to be processed by the read command block 112a or the signals corresponding to the read address channel may further include a user definition signal ARUSER about the read address channel.

In an embodiment of the present disclosure, the signals to be processed by the read data block 112b or the signals corresponding to the read data channel may further include a user definition signal RUSER about the read data channel.

In an embodiment of the present disclosure, the signals to be processed by the write command block 112c or the signals corresponding to the write address channel may further include a user definition signal AWUSER about the write address channel.

In an embodiment of the present disclosure, the signals to be processed by the write data block 112d or the signals corresponding to the write data channel may further include a user definition signal WUSER about the write data channel.

In an embodiment of the present disclosure, the signals to be processed by the write response block 112e or the signals corresponding to the write response channel may further include a user definition signal BUSER about the write response channel.

In an embodiment of the present disclosure, the SFPC 120 may provide corresponding attribute information PR as at least one of the user definition signals ARUSER, RUSER, AWUSER, WUSER, and BUSER. For example, when the master interface 112 of FIG. 5 is connected with the first master device M1, the SFPC 120 may provide the first master attribute information PR_M1 corresponding to the safety level of the first master device M1 through the user definition signal (e.g., ARUSER) of the read address channel and the user definition signal (e.g., AWUSER) of the write address channel. The bus control block 111 may identify the safety level of the first master device M1, based on the first master attribute information PR_M1 received through the user definition signal (e.g., ARUSER) of the read address channel and the user definition signal (e.g., AWUSER) of the write address channel.

The SFPC 120 may directly provide the slave attribute information PR_S1, PR_S2, and PR_S3 respectively corresponding to the plurality of slave devices S1, S2, and S3 to the bus control block 111. For example, the SFPC 120 may be connected with a separate master interface, and the SFPC 120 may directly provide the attribute information PR_S1, PR_S2, and PR_S3 corresponding to the plurality of slave devices S1, S2, and S3 to the bus control block 111 through the separate master interface.

In addition, the SFPC 120 may provide the attribute information PR_S1, PR_S2, and PR_S3 corresponding to the plurality of slave devices S1, S2, and S3 to the bus control block 111 through a slave interface.

The above signals that the read command block 112a, the write command block 112c, and the write data block 112d receive may be provided to the bus control block 111, and the above signals that the read data block 112b and the write response block 112e transmit may be provide from the bus control block 111.

As described above, the bus control block 111 may identify a safety level of a master device requesting an access, based on attribute information (e.g., PR_M1 or PR_M2) received through the master interface 112, and may identify the safety level of each of the slave devices S1, S2, and S3, based on the attribute information PR_S1, PR_S2, and PR_S3 received from the SFPC 120. Depending on a safety level of a master device requesting an access and a safety level of a slave device to be accessed, the bus control block 111 may selectively transfer an access request or a transaction received through the master interface 112 to the slave device or may block the access request or transaction. As such, an access to a slave device having a relatively high safety level from a master device having a relatively low safety level may be blocked, and thus, Freedom From Interference (FFI) may be accomplished.

In an embodiment of the present disclosure, the bus control block 111 may include path controllers such as an arbiter configured to transfer a signal from a master interface to a slave interface and a decoder configured to transfer a signal from the slave interface to the master interface. The bus control block 111 may selectively block an access or a transaction through the above path controllers.

In an embodiment of the present disclosure, the interconnect bus 110 may be based on a bus appropriate for the AXI protocol, but the present disclosure is not limited thereto. It is to be understood that the slave interface 113 may have a structure similar to that of the master interface 112 described above.

Figure 6:
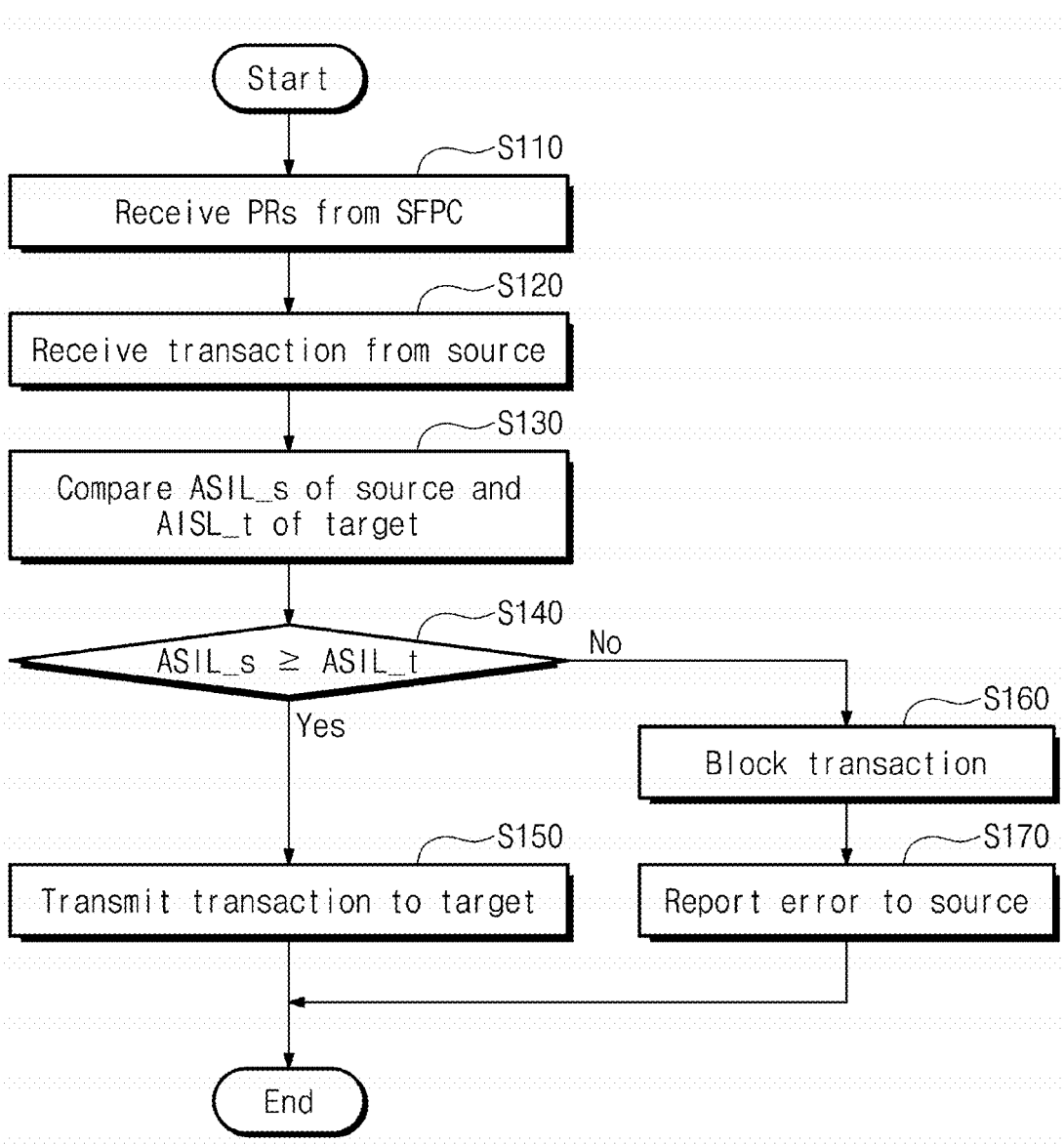
FIG. 6 is a flowchart illustrating an operation of a bus control block of FIG. 3.

FIG. 6 is a flowchart illustrating an operation of a bus control block of FIG. 3. Referring to FIGS. 3 and 6, in operation S110, the bus control block 111 may receive a plurality of attribute information PRs from the SFPC 120. For example, the SFPC 120 may provide the attribute information PR_M1 and PR_M2 respectively corresponding to the plurality of master devices M1 and M2 to the bus control block 111 through the corresponding master interface IF_M1 or IF_M2. In other words, the SPFC 120 may provide the attribute information PR_M1 and PR_M2 respectively corresponding to the plurality of master devices M1 and M2 to the bus control block 111 through an intervening component. The SFPC 120 may directly provide the attribute information PR_S1, PR_S2, and PR_S3 respectively corresponding to the plurality of slave devices S1, S2, and S3 to the bus control block 111.

In operation S120, the bus control block 111 may receive a transaction from a source. For example, the bus control block 111 may receive a request for an access to one of the plurality of slave devices S1, S2, and S3 from one of the plurality of master devices M1 and M2. In this case, the one of the plurality of master devices M1 and M2 may correspond to the source, the one of the plurality of slave devices S1, S2, and S3 may correspond to a target, and the request for the access to the target from the source may correspond to the term "transaction". In addition, the request for access may be a read request or a write request.

In operation S130, the bus control block 111 may compare a safety level ASIL_s of the source and a safety level ASIL_t of the target. For example, the bus control block 111 may identify a safety level of each of the plurality of master devices M1 and M2 and the plurality of slave devices S1, S2, and S3, based on the plurality of attribute information PRs. The bus control block 111 may compare the safety level ASIL_s of the source and the safety level ASIL_t of the target, based on the identified safety levels. In other words, when the first master device M1 requests access to the first slave device S1, the safety level of the first master device M1 is compared to that of the first slave device S1.

When it is determined in operation S140 that the safety level ASIL_s of the source is higher than or equal to the safety level ASIL_t of the target, the bus control block 111 performs operation S150; if not, the bus control block 111 performs operation S160 and operation S170.

First, it is to be understood that when a safety level of a source is higher than a safety level of a target, this may mean that the required reliability for a safety level of a source to be higher than or equal to that of a target has been met. As an example, it will be assumed that a source is the second master device M2 and a target is the third slave device S3. In this case, a safety level ASIL_s of the source is the ASIL-B level, and a safety level ASIL_t of the target is the ASIL_A level. In this case, the safety level ASIL_s of the source (i.e., ASIL_B) is higher the safety level ASIL_t of the target (i.e., ASIL_A). In this case, in operation S150, the bus control block 111 may transmit a transaction from the target. In other words, the second master device M2 may be allowed to read or write from the third slave device S3. As can be seen, since a source having a relatively higher safety level accesses a target having a relatively lower safety level, this access may not be against the FFI. Accordingly, the bus control block 111 may transfer a transaction to a target. In other words, a normal operation is performed.

On the other hand, in the case where a target is the first slave device S1, a safety level ASIL_t of the target may be the ASIL_C level. In this case, the safety level ASIL_s of the source (i.e., ASIL_B) is lower the safety level ASIL_t of the target (i.e., ASIL_C). In this case, in operation S160, the bus control block 111 may block a transaction; in other words, the second master device M2 may not be allowed to read or write from the third slave device S3. In operation S170, the bus control block 111 may report an error to the source. Thus, since a source having a relatively lower safety level accesses a target having a relatively higher safety level, this access is against the FFI. Accordingly, the bus control block 111 may prevent an error due to an access being against the FFI by blocking a transaction.

Figure 7:
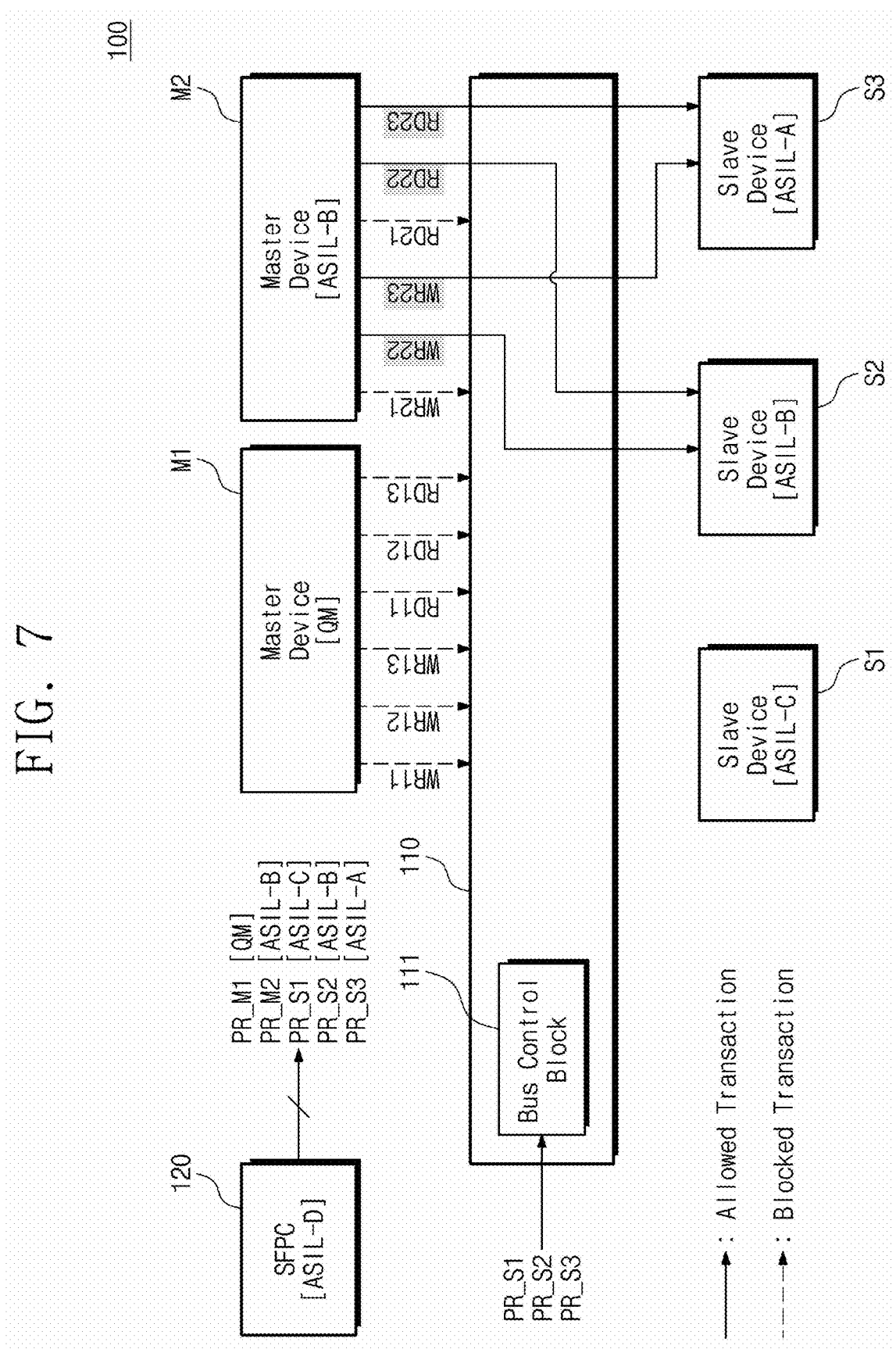
FIG. 7 is a diagram for describing a configuration of a transaction blocked according to the flowchart of FIG. 6.

FIG. 7 is a diagram for describing a configuration of a transaction blocked or allowed according to the flowchart of FIG. 6. For convenience of description, an additional description associated with the components described above will be omitted to avoid redundancy. Referring to FIGS. 6 and 7, the system-on-chip 100 may include the plurality of master devices M1 and M2, the plurality of slave devices S1, S2, and S3, the interconnect bus 110, and the SFPC 120. The interconnect bus 110 may include the bus control block 111. The SFPC 120 may output the plurality of attribute information PR_M1, PR_M2, PR_S1, PR_S2, and PR_S3.

As illustrated in FIG. 7, the first master device M1 may provide write transactions WR11, WR12, and WR13 to the interconnect bus 110 for a write operation of each of the first to third slave devices S1, S2, and S3, and may provide read transactions RD11, RD12, and RD13 to the interconnect bus 110 for a read operation of each of the first to third slave devices S1, S2, and S3. The safety level of the first master device M1 is the QM level, and the safety levels of the first to third slave devices S1, S2, and S3 may be the ASIL-C level, the ASIL-B level, and ASIL-A level, respectively. In other words, the safety level of the first master device M1 is lower than the safety levels of the first to third slave devices S1, S2, and S3. Accordingly, as described above, the bus control block 111 may block all of write transactions WR11, WR12, and WR13 and the read transactions RD11, RD12, and RD13 from the first master device M1. In FIG. 7, the blocked transactions may be illustrated by dashed lines.

The second master device M2 may provide write transactions WR21, WR22, and WR23 to the interconnect bus 110 for a write operation of each of the first to third slave devices S1, S2, and S3, and may provide read transactions RD21, RD22, and RD23 to the interconnect bus 110 for a read operation of each of the first to third slave devices S1, S2, and S3. The safety level of the second master device M2 is the ASIL-B level, and the safety levels of the first to third slave devices S1, S2, and S3 may be the ASIL-C level, the ASIL-B level, and ASIL-A level, respectively. In other words, the safety level of the second master device M2 is higher than or equal to the safety levels of the second and third slave devices S2 and S3 and is lower than the safety level of the first slave device S1. Accordingly, as described above, the bus control block 111 may allow the write transactions WR22 and WR23 and the read transactions RD22 and RD23 associated with the second and third slave devices S2 and S3, which are provided from the second master device M2, and may block the write transaction WR21 and the read transaction RD21 associated with the first slave device S1.

Figure 8:
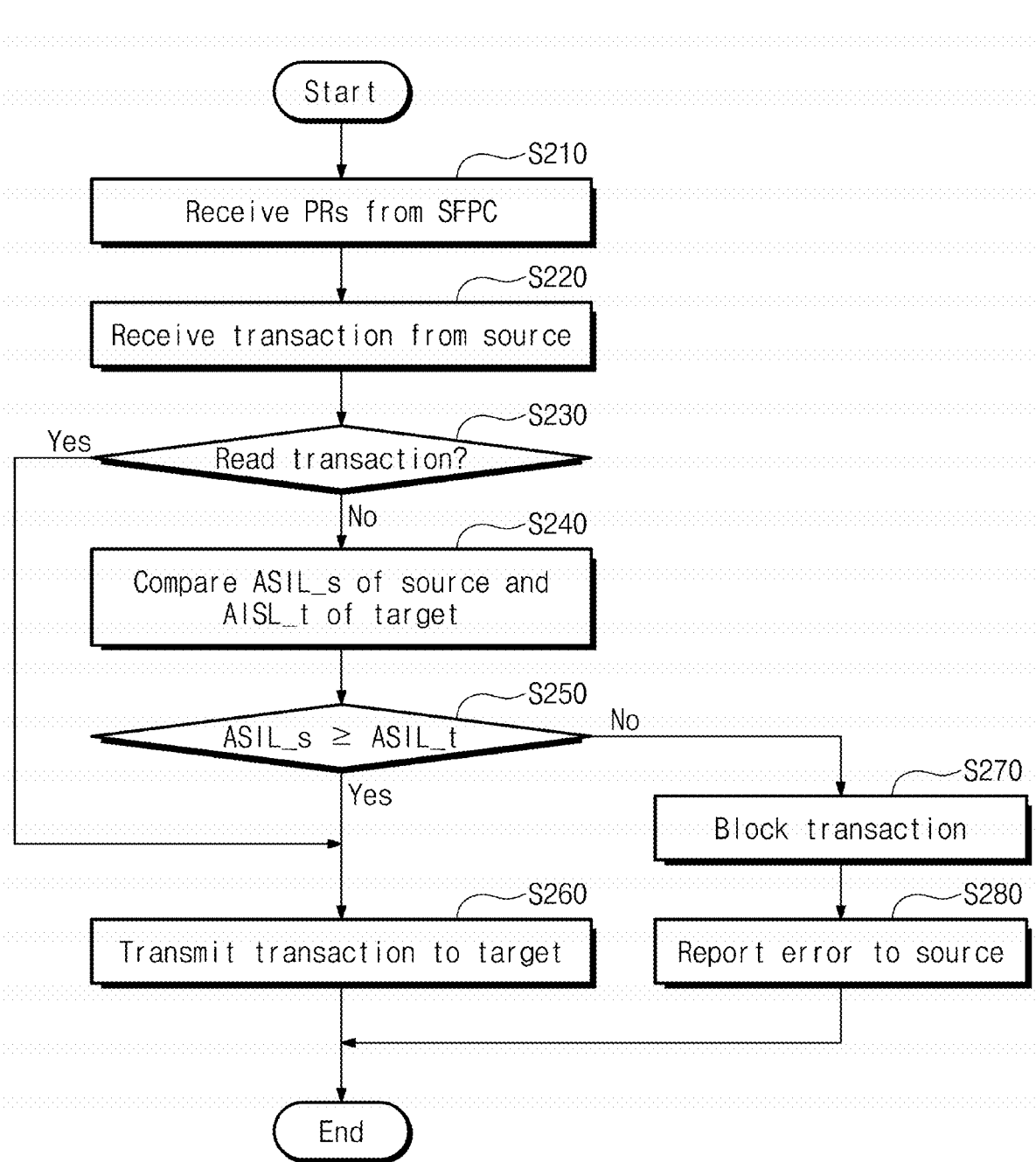
FIG. 8 is a flowchart illustrating an operation of a bus control block of FIG. 3.

FIG. 8 is a flowchart illustrating an operation of a bus control block of FIG. 3. Referring to FIGS. 3 and 8, the bus control block 111 may perform operation S210 and operation S220. Operation S210 and operation S220 are similar to operation S110 and operation S120 of FIG. 6, and thus, an additional description will be omitted to avoid redundancy.

In operation S230, the bus control block 111 may determine whether a received transaction is a read transaction. When the received transaction is the read transaction, in operation S260, the bus control block 111 may transfer the read transaction to a target regardless of safety levels of a source and the target. In other words, reads may be allowed even by devices with lower safety levels than their target. When the received transaction is not the read transaction (e.g., when the received transaction is a write transaction), the bus control block 111 may perform operation S240 to operation S280. Operation S240 to operation S280 are similar to operation S130 to operation S170 of FIG. 6, and thus, additional description will be omitted to avoid redundancy.

Figure 9:
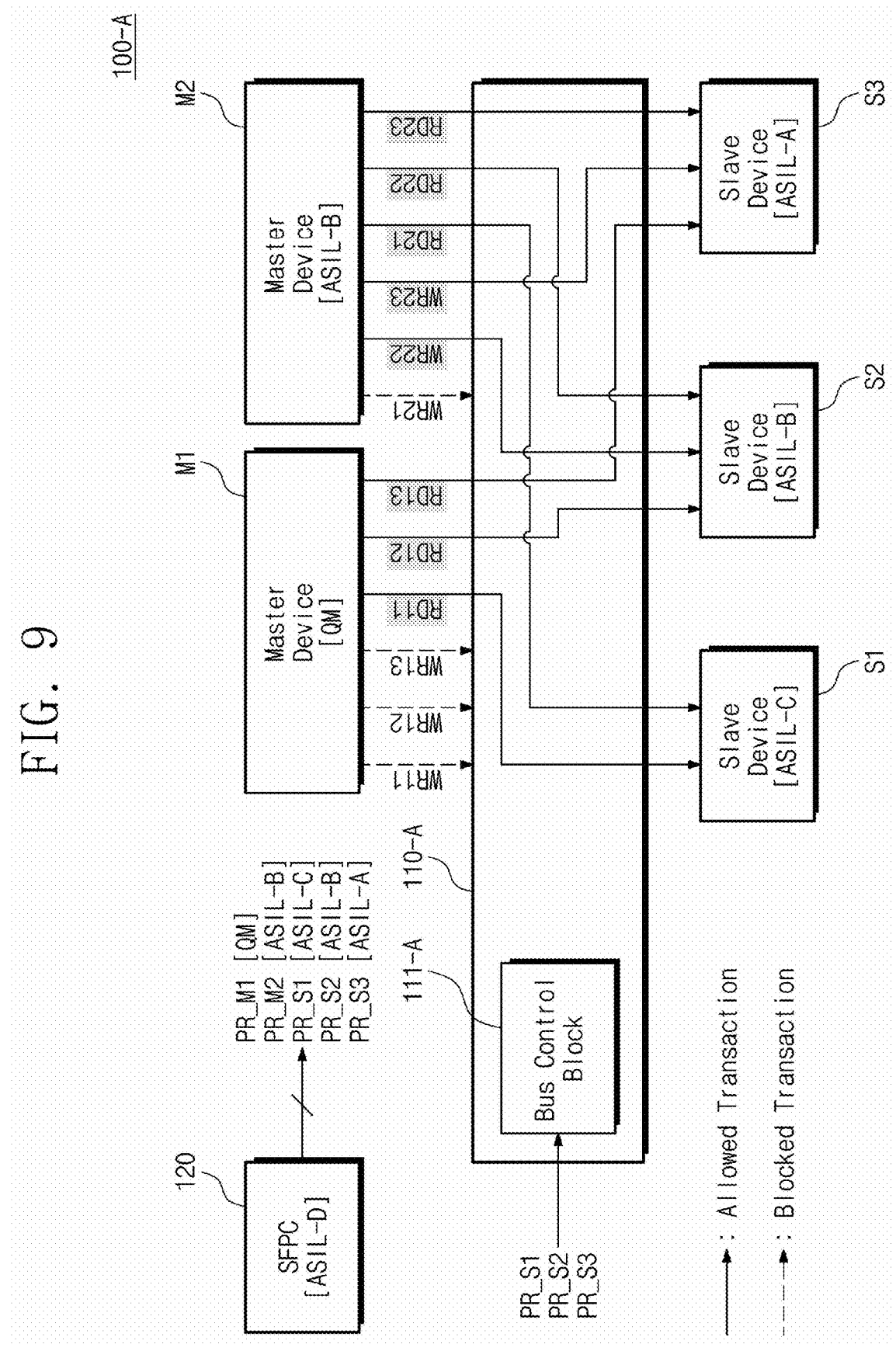
FIG. 9 is a diagram for describing an operation according to the flowchart of FIG. 8.

FIG. 9 is a diagram for describing an operation according to the flowchart of FIG. 8. For convenience of description, an additional description associated with the components described above will be omitted to avoid redundancy. Referring to FIGS. 8 and 9, a system-on-chip 100-A may include the plurality of master devices M1 and M2, the plurality of slave devices S1, S2, and S3, an interconnect bus 110-A, and the SFPC 120. The interconnect bus 110-A may include a bus control block 111-A. The SFPC 120 may output the plurality of attribute information PR_M1, PR_M2, PR_S1, PR_S2, and PR_S3.

As in the above description, the first master device M1 may provide the write transactions WR11, WR12, and WR13 and the read transactions RD11, RD12, and RD13 to the interconnect bus 110-A, and the second master device M2 may provide the write transactions WR21, WR22, and WR23 and the read transactions RD21, RD22, and RD23 to the interconnect bus 110-A.

As described with reference to FIG. 8, the bus control block 111-A may transfer the read transactions RD11, RD12, RD13, RD21, RD22, and RD23 from the first and second master devices M1 and M2 to corresponding slave devices regardless of safety levels of the first and second master devices M1 and M2. In other words, all reads will be permitted. On the other hand, the bus control block 111-A may transfer some of the write transactions WR11, WR12, WR13, WR21, WR22, and WR23 from the first and second master devices M1 and M2 to corresponding slave devices, based on safety levels of the first and second master devices M1 and M2. For example, the write transactions WR11, WR12 and WR13 from the first master device M1 will be blocked, the write transaction WR21 from the second master device M2 will be blocked, but the write transactions WR22 and WR23 from the second master device M2 will be permitted.

As described above, the bus control block 111-A may transfer a read transaction to a target, regardless of a safety level. In other words, even though a master device having a relatively low safety level performs a read operation on a slave device having a relatively high safety level, data modification in the slave device having a relatively high safety level may not occur, and thus, there may be no problem in safety due to an error. In addition, in certain situations, a master device having a relatively low safety level may require data about a slave device having a relatively high safety level. In this case, as described above, a normal operation may be supported by transferring a read transaction regardless of a safety level.

Figure 10:
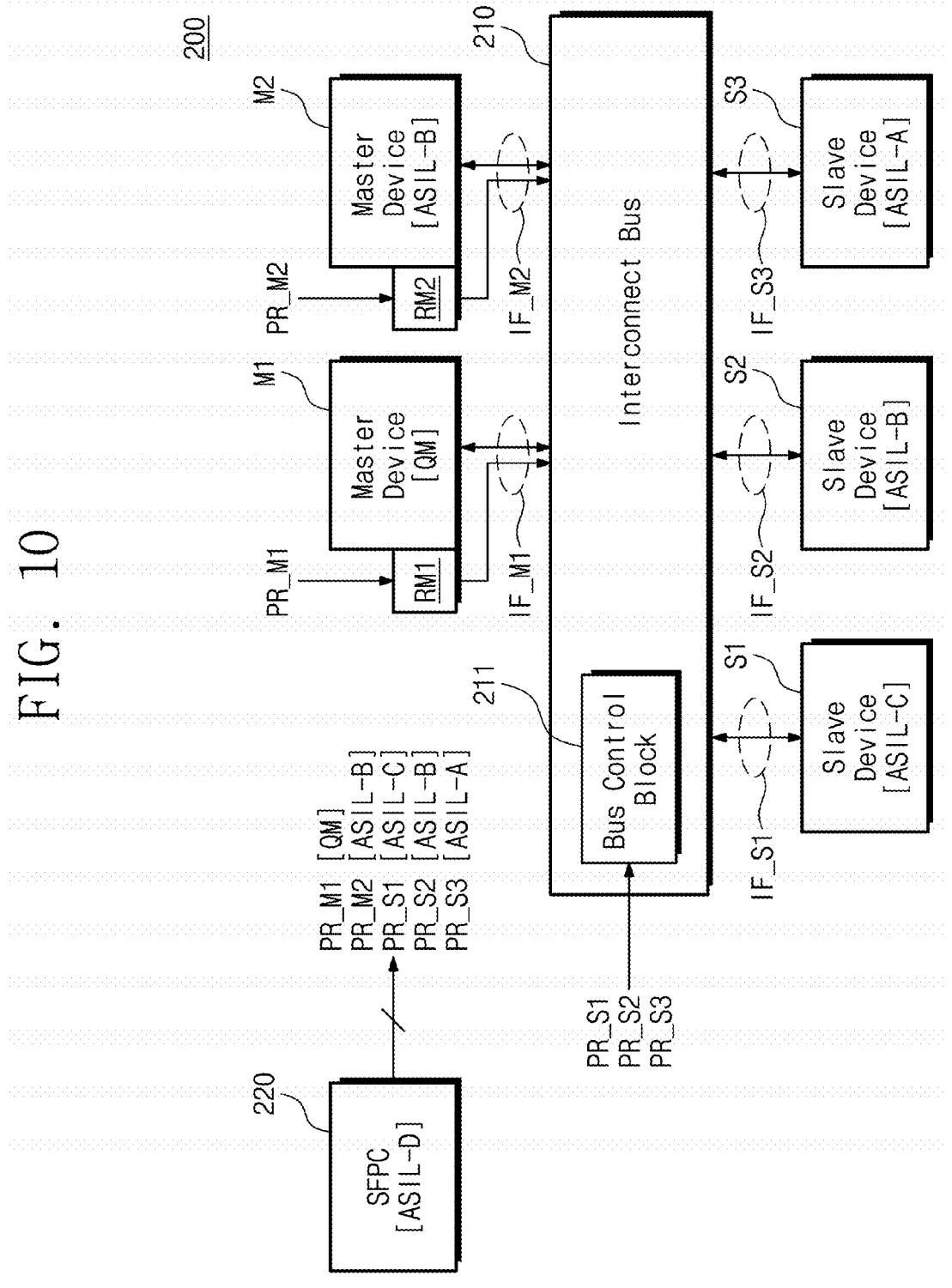
FIG. 10 is a block diagram illustrating a system-on-chip according to an embodiment of the present disclosure.

FIG. 10 is a block diagram illustrating a system-on-chip according to an embodiment of the present disclosure. Referring to FIG. 10, a system-on-chip 200 may include a plurality of master devices M1 and M2, a plurality of slave devices S1, S2, and S3, an interconnect bus 210, and an SFPC 220. The interconnect bus 210 may include a bus control block 211. The SFPC 220 may output a plurality of attribute information PR_M1, PR_M2, PR_S1, PR_S2, and PR_S3 respectively corresponding to levels of the plurality of master devices M1 and M2 and the plurality of slave devices S1, S2, and S3. The safety levels of the plurality of master devices M1 and M2 and the plurality of slave devices S1, S2, and S3 are described above, and thus, an additional description will be omitted to avoid redundancy.

The system-on-chip 200 may further include a plurality of master registers RM1 and RM2. The plurality of master registers RM1 and RM2 may be set by the master attribute information PR_M1 and PR_M2 from the SFPC 220.

For example, the first master register RM1 may be set by the master attribute information PR_M1 from the SFPC 220. In other words, the first master register RM1 may be configured to store information corresponding to the QM level. The second master register RM2 may be set by the master attribute information PR_M2 from the SFPC 220. In other words, the second master register RM2 may be configured to store information corresponding to the ASIL-B level.

The plurality of master registers RM1 and RM2 may be configured to output corresponding information through master interfaces IF_M1 and IF_M2. For example, the first master register RM1 may be configured to output information or a signal corresponding to the QM level through the first master interface IF_M1. In this case, the signal from the first master register RM1 may be provided as at least one of user definition signals (e.g., AxUSER) (i.e., ARUSER, RUSER, AWUSER, WUSER, and BUSER) included in the first master interface IF_M1. The second master register RM2 may be configured to output information or a signal corresponding to the ASIL-B level through the second master interface IF_M2. In this case, the signal from the second master register RM2 may be provided as at least one of user definition signals (e.g., AxUSER) (i.e., ARUSER, RUSER, AWUSER, WUSER, and BUSER) included in the second master interface IF_M2.

The bus control block 211 may output a transaction blocking operation, based on the plurality of attribute information PR_M1, PR_M2, PR_S1, PR_S2, and PR_S3. The transaction blocking operation is similar to that described above, and thus, an additional description will be omitted to avoid redundancy.

As described above, the system-on-chip 200 may include the plurality of master registers RM1 and RM2 respectively corresponding to the plurality of master devices M1 and M2, and the plurality of master registers RM1 and RM2 may be set by the SFPC 220 based on attribute information (or safety levels) of corresponding master devices. In an embodiment of the present disclosure, the plurality of master registers RM1 and RM2 may be implemented with a separate register block in the system-on-chip 200. Alternatively, the plurality of master registers RM1 and RM2 may be respectively included in the plurality of master devices M1 and M2.

Figure 11:
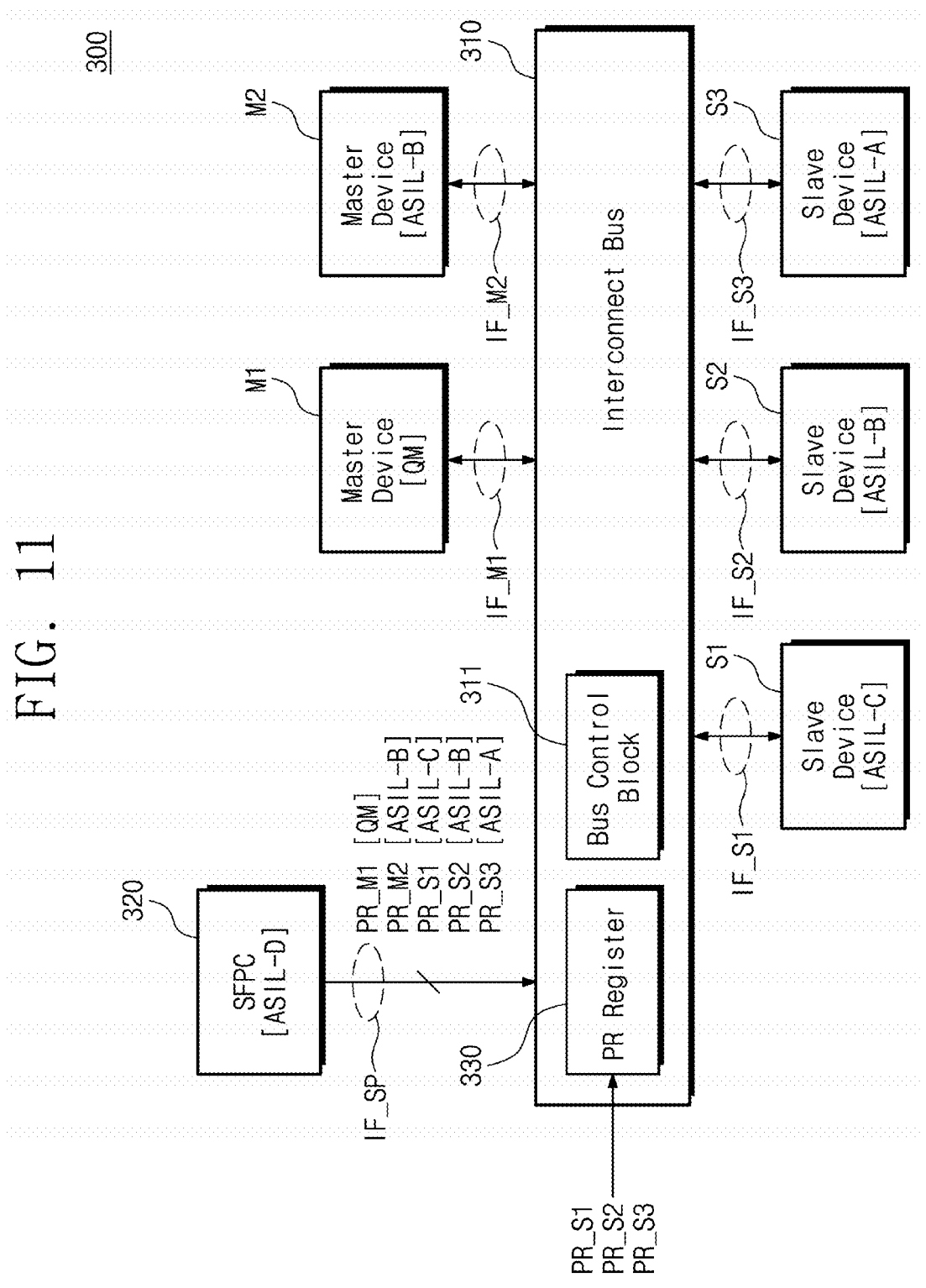
FIG. 11 is a block diagram illustrating a system-on-chip according to an embodiment of the present disclosure.

FIG. 11 is a block diagram illustrating a system-on-chip according to an embodiment of the present disclosure. Referring to FIG. 11, a system-on-chip 300 may include a plurality of master devices M1 and M2, a plurality of slave devices S1, S2, and S3, an interconnect bus 310, and an SFPC 320. The SFPC 320 may output a plurality of attribute information PR_M1, PR_M2, PR_S1, PR_S2, and PR_S3 respectively corresponding to safety levels of the plurality of master devices M1 and M2 and the plurality of slave devices S1, S2, and S3. The safety levels of the plurality of master devices M1 and M2 and the plurality of slave devices S1, S2, and S3 are described above, and thus, an additional description will be omitted to avoid redundancy.

The interconnect bus 310 may include a bus control block 311 and an attribute information register 330. The attribute information register 330 may be set by the plurality of attribute information PR_M1, PR_M2, PR_S1, PR_S2, and PR_S3 from the SFPC 320 or may be configured to store the plurality of attribute information PR_M1, PR_M2, PR_S1, PR_S2, and PR_S3. The bus control block 311 may perform a safety level-based transaction blocking operation described above, based on the plurality of attribute information PR_M1, PR_M2, PR_S1, PR_S2, and PR_S3 stored in the attribute information register 330. In other words, the attribute information or safety level of each of the plurality of master devices M1 and M2 and the plurality of slave devices S1, S2, and S3 may be stored in the attribute information register 330 included in the interconnect bus 310. In this case, the bus control block 311 may identify the safety level of each of the plurality of master devices M1 and M2 and the plurality of slave devices S1, S2, and S3 without receiving attribute information through a master interface or a slave interface.

In an embodiment of the present disclosure, the SFPC 320 may provide the plurality of attribute information PR_M1, PR_M2, PR_S1, PR_S2, and PR_S3 to the attribute information register 330 of the interconnect bus 310 through a separate master interface IF_SP or any other interface.

Figure 12:
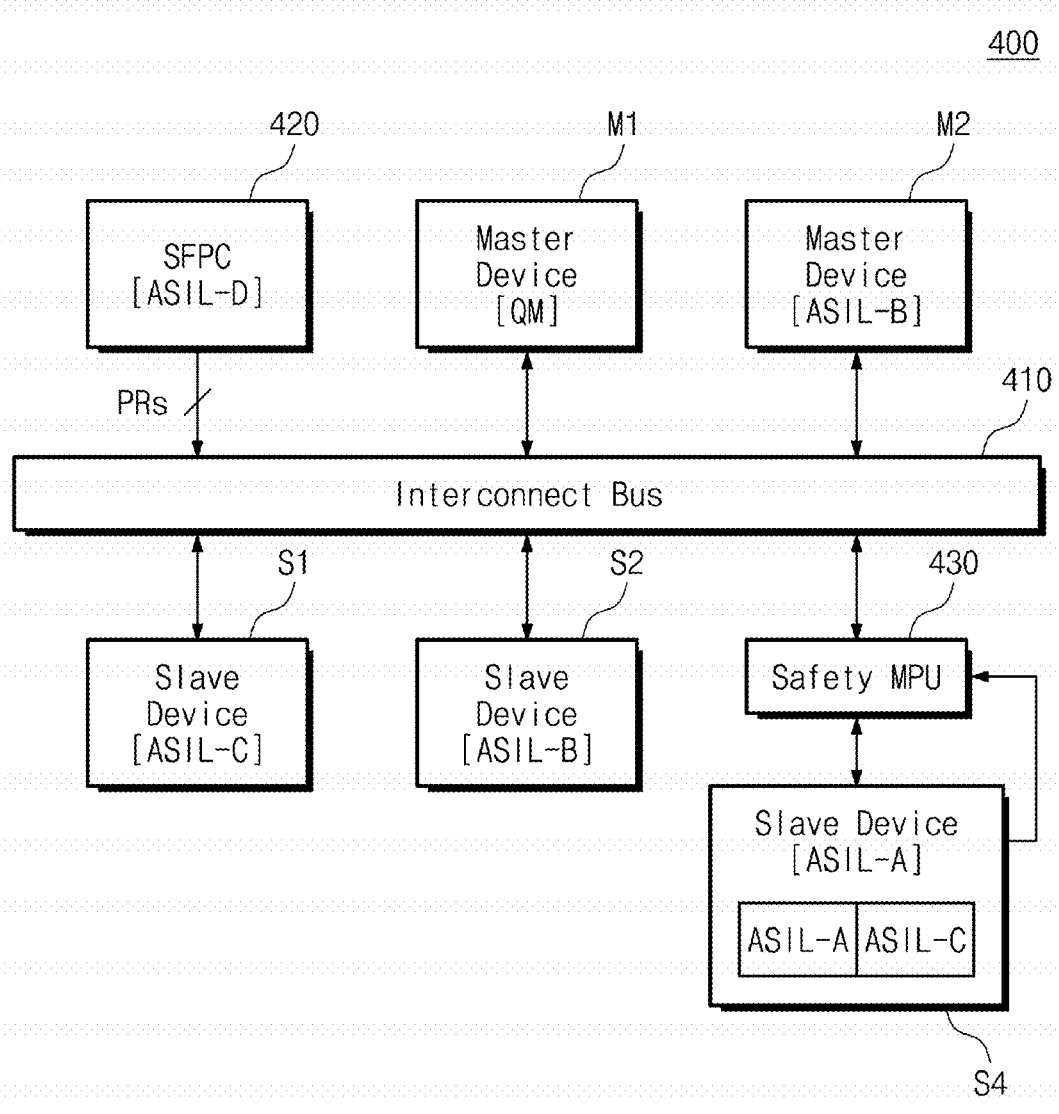
FIG. 12 is a block diagram illustrating a system-on-chip according to an embodiment of the present disclosure.

FIG. 12 is a block diagram illustrating a system-on-chip according to an embodiment of the present disclosure. Referring to FIG. 12, a system-on-chip 400 may include a plurality of master devices M1 and M2, a plurality of slave devices S1, S2, and S4, an interconnect bus 410, an SFPC 420, and a safety memory protecting unit (MPU) 430.

The plurality of master devices M1 and M2, the plurality of slave devices S1, and S2, the interconnect bus 410, and the SFPC 420 are described above, and thus, an additional description will be omitted to avoid redundancy. In other words, the interconnect bus 410 may be configured to selectively block a transaction, based on safety levels.

In an embodiment of the present disclosure, a specific slave device may include a plurality of regions, and the plurality of regions included in the specific slave device may have different safety levels. For example, as illustrated in FIG. 12, the fourth slave device S4 may include a region having the ASIL-A level and a region having the ASIL-C level. In other words, the fourth slave device S4 may have a first region with a first safety level and a second region with a second safety level. In a more detailed example, the fourth slave device S4 may be a dynamic random access memory (DRAM) device that is used in the system-on-chip 400, and a first storage region of the DRAM device may have the ASIL-A level, and a second storage region of the DRAM may have the ASIL-C level. In this case, a safety level of the fourth slave device S4 may be set to the lowest level (e.g., the ASIL-A level) of the safety levels corresponding to the plurality of regions. In other words, access to the fourth slave device S4 may be possible in some cases from a device having a safety level lower than a maximum safety level (e.g., the ASIL-C level) of the fourth slave device S4.

In this case, when the second master device M2 having the ASIL-B level accesses a specific region of the fourth slave device S4, because the safety level ASIL-B of the second master device M2 is higher than the safety level ASIL-A of the fourth slave device S4, the interconnect bus 410 may transfer an access or a transaction from the second master device M2 to the fourth slave device S4.

In the above operation, in the case where the second master device M2 accesses a region of the ASIL-A level belonging to the fourth slave device S4, the FFI issue may not occur; but, in the case where the second master device M2 accesses a region of the ASIL-C level belonging to the fourth slave device S4, the FFI issue may occur. To prevent this from happening, the safety memory protecting unit 430 may be configured to selectively block a transaction, based on a safety level corresponding to a transaction transferred from the interconnect bus 410 and a safety level of a target region. In other words, the safety memory protecting unit 430 may block transactions originating from the second master device M2 to the region of the ASIL-C level belonging to the fourth slave device S4.

For example, the safety memory protecting unit 430 may identify a safety level of a source, based on information (e.g., a transaction) provided from the interconnect bus 410. In an embodiment of the present disclosure, a safety level of a source may be provided through a user definition signal AxUSER. The safety memory protecting unit 430 may receive attribute information from the fourth slave device S4 and may identify a safety level of each of regions included in the fourth slave device S4, based on the received attribute information.

The safety memory protecting unit 430 may compare the safety level of the source and the safety level of the target (e.g., region) based on the identified safety levels and may selectively block a transfer of the transaction to the fourth slave device S4 depending on a result of the comparison. In an embodiment of the present disclosure, the target may indicate a region, which the source intends to access, from among the regions included in the fourth slave device S4. In other words, when the second master device M2 having the ASIL-B level accesses a region of the ASIL-A level belonging to the fourth slave device S4, an access request or a transaction from the second master device M2 may be transferred to the fourth slave device S4 through the interconnect bus 410 and the safety memory protecting unit 430. On the other hand, when the second master device M2 having the ASIL-B level accesses a region of the ASIL-C level belonging to the fourth slave device S4, an access request or a transaction from the second master device M2 may be transferred to the safety memory protecting unit 430 through the interconnect bus 410, but the transaction may be blocked by the safety memory protecting unit 430.

In an embodiment of the present disclosure, the safety memory protecting unit 430 may perform the above transfer or blocking operation on all transactions for the fourth slave device S4, based on a safety level of each region and a safety level of a source corresponding to a received transaction. Alternatively, the safety memory protecting unit 430 may perform the above transfer or blocking operation on all transactions other than a read transaction for the fourth slave device S4, based on a safety level of each region and a safety level of a source corresponding to a received transaction. In other words, the safety memory protecting unit 430 may perform the above transfer or blocking operation on all write transactions for the fourth slave device S4.

In an embodiment of the present disclosure, information about the safety levels respectively corresponding to the plurality of regions included in the fourth slave device S4 may be provided from the fourth slave device S4. Alternatively, the information about the safety levels respectively corresponding to the plurality of regions included in the fourth slave device S4 may be provided from the SFPC 420. Alternatively, the information about the safety levels respectively corresponding to the plurality of regions included in the fourth slave device S4 may be provided through the interconnect bus 410 together with a transaction for the fourth slave device S4. In an embodiment of the present disclosure, the information about the safety levels respectively corresponding to the plurality of regions included in the fourth slave device S4 may be provided through at least one of various user definition signals ARUSER, RUSER, AWUSER, WUSER, BUSER, etc. described above.

Figure 13:
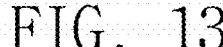
FIG. 13 is a flowchart illustrating an operation of a system-on-chip of FIG. 12.

FIG. 13 is a flowchart illustrating an operation of a system-on-chip of FIG. 12. For convenience of description, the flowchart of FIG. 13 will be described with reference to the system-on-chip 400 of FIG. 12. Referring to FIGS. 12 and 13, in operation S310, the first master device M1 having the QM level may provide the interconnect bus 410 with a first transaction TR1 for the fourth slave device S4 having the ASIL-A level. In operation S311, the interconnect bus 410 may report an error to the first master device M1. This is because a safety level (i.e., the QM level) of the first master device M1 is lower than a safety level (i.e., the ASIL-A level) of the fourth slave device S4. Thus, to prevent the FFI issue, the interconnect bus 410 may block the first transaction TR1 and may report an error to the first master device M1.

In operation S320, the second master device M2 having the ASIL-B level may provide the interconnect bus 410 with a second transaction TR2 for the fourth slave device S4 having the ASIL-A level. In operation S321, the interconnect bus 410 transfers the second transaction TR2 to the safety memory protecting unit 430. This is because the safety level (i.e., the ASIL-B level) of the second master device M2 is higher than the safety level (i.e., the ASIL-A level) of the fourth slave device S4. Therefore, the FFI issue does not occur. Accordingly, the interconnect bus 410 may provide the second transaction TR2 to the safety memory protecting unit 430 connected with the fourth slave device S4.

In operation S322, the safety memory protecting unit 430 may determine whether a safety level ASIL_s of a source is higher than or equal to a safety level ASIL_t of a target. In this case, the safety level ASIL_s of the source may be the ASIL-B level corresponding to the second master device M2, which is the source of the second transaction TR2, and the safety level ASIL_t of the target may be a safety level of one region, which corresponds to the target of the second transaction TR2, from among the plurality of regions of the fourth slave device S4.

When the safety level ASIL_s of the source is lower than the safety level ASIL_t of the target, in operation S323, the safety memory protecting unit 430 may report an error to the second master device M2. For example, in the case where the second master device M2 accesses a region having the ASIL-C level from among the plurality of regions of the fourth slave device S4, the safety level ASIL_s of the source may be the ASIL-B level, and the safety level ASIL_t of the target may be the ASIL-C level. Thus, an operation in which the second master device M2 accesses a region having the ASIL-C level from among the plurality of regions of the fourth slave device S4 may cause the FFI issue. As such, the safety memory protecting unit 430 may block the second transaction TR2, thus preventing the FFI issue.

When the safety level ASIL_s of the source is higher than or equal to the safety level ASIL_t of the target, in operation S324, the safety memory protecting unit 430 may transfer the second transaction TR2 to the fourth slave device S4. Therefore, in operation S325, the fourth slave device S4 may perform an operation corresponding to the second transaction TR2. For example, in the case where the second master device M2 accesses a region having the ASIL-A level from among the plurality of regions of the fourth slave device S4, the safety level ASIL_s of the source may be the ASIL-B level, and the safety level ASIL_t of the target may be the ASIL-A level. In this case, even though the operation corresponding to the second transaction TR2 is performed, the FFI issue may not occur. Accordingly, the safety memory protecting unit 430 may transfer the second transaction TR2 to the fourth slave device S4, and the fourth slave device S4 may perform the operation corresponding to the second transaction TR2. The operation described with reference to FIG. 13 is an example, and the present disclosure is not limited thereto.

Figure 14:
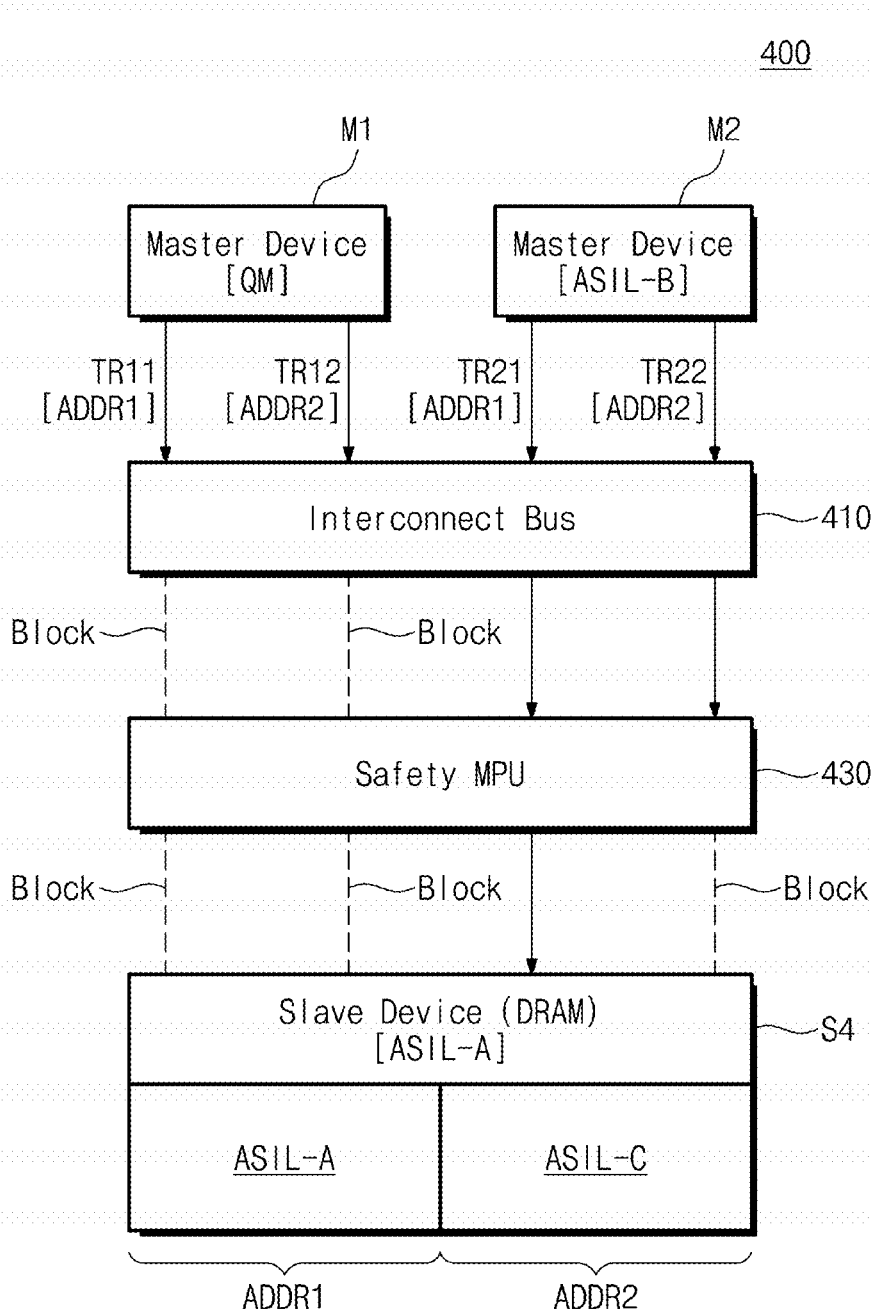
FIG. 14 is a diagram for describing an operation according to the flowchart of FIG. 13.

FIG. 14 is a diagram for describing an operation according to the flowchart of FIG. 13. For convenience of description, some of the components of the system-on-chip 400 are disclosed in FIG. 14. However, the present disclosure is not limited thereto. For convenience of description, an additional description associated with the components described above will be omitted to avoid redundancy.

Referring to FIG. 14, the system-on-chip 400 may include the first and second master devices M1 and M2, the interconnect bus 410, the safety memory protecting unit 430, and the fourth slave device S4.

The fourth slave device S4 may be a DRAM device. The fourth slave device S4 may include a memory region corresponding to a first address region ADDR1 and a memory region corresponding to a second address region ADDR2. The first address region ADDR1 may have the ASIL-A level, and the second address region ADDR2 may have the ASIL-C level. In this case, a safety level of the fourth slave device S4 may be determined as the lowest safety level of the safety levels (e.g., the ASIL-A level and the ASIL-C level) of the memory regions. In other words, the safety level of the fourth slave device S4 may be the ASIL-A level.

The first master device M1 having the QM level may provide the interconnect bus 410 with transactions TR11 and TR12 respectively corresponding to the first and second address regions ADDR1 and ADDR2 of the fourth slave device S4. In this case, because the safety level (i.e., the QM level) of the first master device M1 is lower than the safety level (i.e., the ASIL-A level) of the fourth slave device S4, the interconnect bus 410 may block all of the transactions TR11 and TR12. In other words, the transactions TR11 and TR12 from the first master device M1 may be blocked by the interconnect bus 410.

The second master device M2 having the ASIL-B level may provide the interconnect bus 410 with transactions TR21 and TR22 respectively corresponding to the first and second address regions ADDR1 and ADDR2 of the fourth slave device S4. In this case, because the safety level (i.e., the ASIL-B level) of the second master device M2 is higher than the safety level (i.e., the ASIL-A level) of the fourth slave device S4, the interconnect bus 410 may transfer the transactions TR21 and TR22 to the safety memory protecting unit 430 corresponding to (or connected with) the fourth slave device S4.

The safety memory protecting unit 430 may receive the transactions TR21 and TR22 from the interconnect bus 410. The safety memory protecting unit 430 may identify a safety level (i.e., the ASIL-B level) of a source (i.e., the second master device M2) of the transactions TR21 and TR22, based on the received transactions TR21 and TR22. In other words, the transactions TR21 TR22 may include information indicative of the safety level of the source from which they are sent. For example, at least one of user definition signals (e.g., ARUSER, RUSER, AWUSER, WUSER, and BUSER) included in the transactions TR21 and TR22 may include information (i.e., attribute information) about a safety level (i.e., the ASIL-B level) of a source (i.e., the second master device M2). Therefore, the safety memory protecting unit 430 may identify the safety level of the source, based on at least one of the user definition signals (e.g., ARUSER, RUSER, AWUSER, WUSER, and BUSER).

The safety memory protecting unit 430 may selectively block the transactions TR21 and TR22, based on a result of comparing the identified safety level of the source and a safety level of a target corresponding to each of the transactions TR21 and TR22. In the embodiment illustrated in FIG. 14, the transaction TR21 for the first address region ADDR1 may be transferred to the fourth slave device S4 from the safety memory protecting unit 430, and the transaction TR22 for the second address region ADDR2 may be blocked by the safety memory protecting unit 430.

As described above, a system-on-chip according to the present disclosure may selectively block transactions between a plurality of IP blocks, based on safety levels of the plurality of IP blocks. In this case, an issue (i.e., an FFI issue) due to an IP block having a relatively low safety level accessing an IP block having a relatively high safety level may be prevented. In other words, the FFI defined by the ISO 26262 standard associated with the automotive safety may be satisfied.

Figure 15:
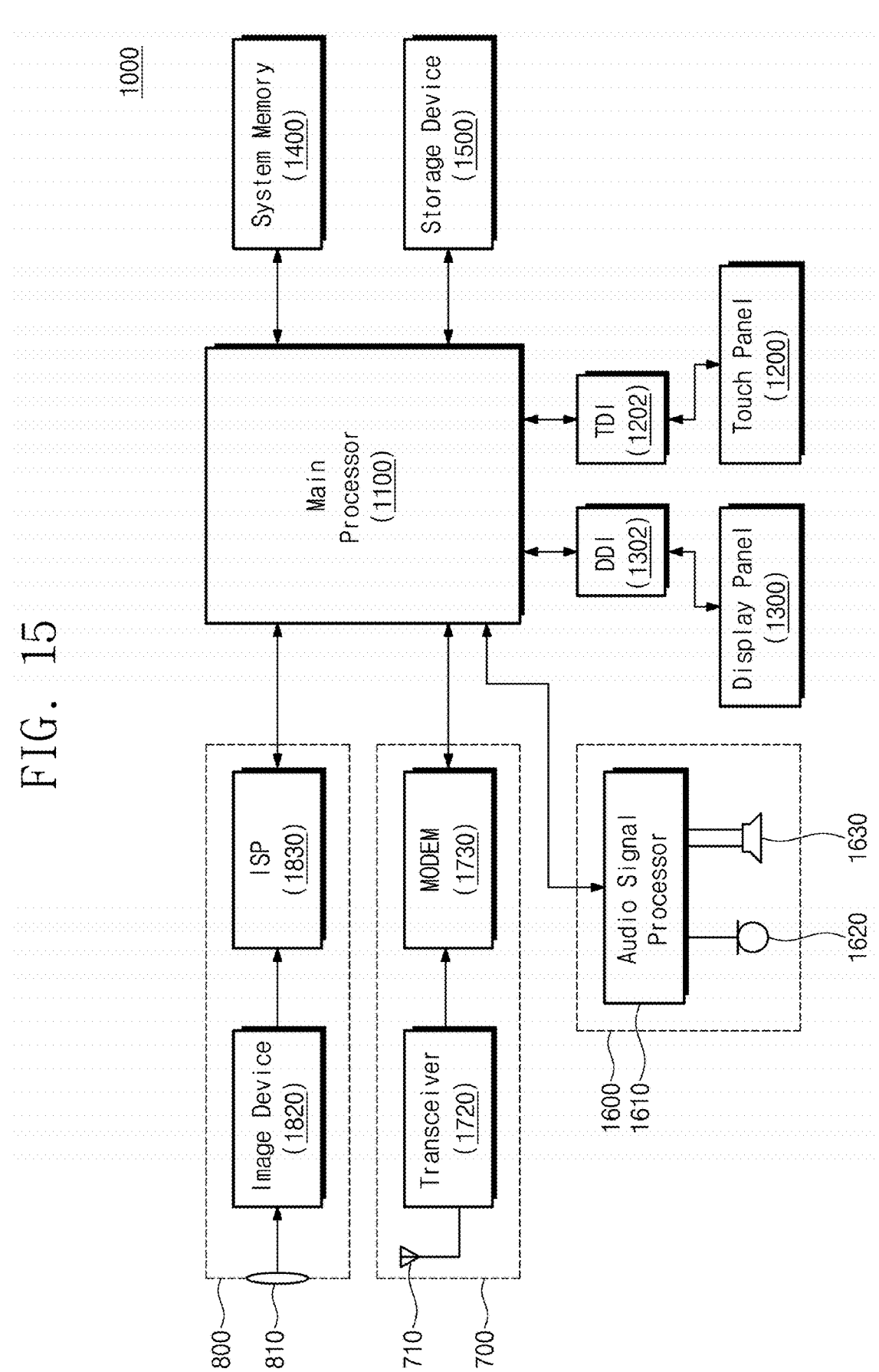
FIG. 15 is a block diagram illustrating a system to which a system-on-chip according to an embodiment of the present disclosure is provided.

FIG. 15 is a block diagram illustrating a system to which a system-on-chip according to an embodiment of the present disclosure is provided. Referring to FIG. 15, a system 1000 may include a main processor 1100, a touch panel 1200, a touch driver integrated circuit 1202, a display panel 1300, a display driver integrated circuit 1302, a system memory 1400, a storage device 1500, an audio processor 1600, a communication block 1700, and an image processor 1800. In an embodiment of the present disclosure, the system 1000 may be one of various electronic devices such as a personal computer, a laptop computer, a workstation, a portable communication terminal, a personal digital assistant (PDA), a portable media player (PMP), a digital camera, a smartphone, a tablet computer, and a wearable device. In an embodiment of the present disclosure, the system 1000 may be an automotive electronic system such as a navigation device, a black box, or an autonomous driving system or may be included in the automotive electronic system.

The main processor 1100 may control overall operations of the system 1000. The main processor 1100 may control/ manage operations of the components of the system 1000. The main processor 1100 may process various operations for the purpose of operating the system 1000. The touch panel 1200 may be configured to sense a touch input from a user under control of the touch driver integrated circuit 1202. The display panel 1300 may be configured to display image information under control of the display driver integrated circuit 1302.

The system memory 1400 may store data that are used in an operation of the system 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (Re-RAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the system 1000. In an embodiment of the present disclosure, the storage device 1500 may include a nonvolatile memory and may perform a delta verification operation on the nonvolatile memory.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID). The image processor 1800 may receive a light through a lens 1810. An image device 1820 and an image signal processor (ISP) 1830 included in the image processor 1800 may generate image information about an external object, based on a received light.

In an embodiment, the components illustrated in FIG. 15 may be a plurality of master devices or a plurality of slave devices described with reference to FIGS. 1 to 14. Alternatively, various function (or IP) blocks included in the main processor 1100 of FIG. 15 may be the plurality of master devices or the plurality of slave devices. In an embodiment of the present disclosure, the components illustrated in FIG. 15 may communicate with each other through an interconnect bus described with reference to FIGS. 1 to 14, and the interconnect bus may allow or block an access request or a transaction, based on a safety level corresponding to each component or corresponding attribute information as described above.

According to an embodiment of the present disclosure, each of various devices included in a system-on-chip may have a safety level (e.g., an automotive safety integrity level (ASIL)). By using the safety levels of the devices, the system-on-chip may manage access requests or transactions between the devices or may selectively block the access requests or transactions. As such, an access to a device having a relatively high safety level from a device having a relatively low safety level may be prevented. Accordingly, the safety of the system-on-chip may be improved, or the FFI (Freedom From Interference) defined by the ISO 26262 standard may be accomplished.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A system-on-chip comprising:
a first slave device having a first slave automotive safety integrity level (ASIL), the first slave device including a first address region having the first slave ASIL and a second address region having a second slave ASIL being higher than the first slave ASIL;
a first master device configured to output a first access request for the first address region and a second access request for the second address region, the first master device having a first master ASIL; and
a safety memory protecting unit configured to:
receive the first access request and the second access request,
transfer the first access request to the first slave device in response to a case in which the first master ASIL is equal to or higher than the first slave ASIL, and
block the second access request in response to a case in which the first master ASIL is lower than the second slave ASIL.

2. The system-on-chip of claim 1, wherein the first slave device is a dynamic random access memory (DRAM) device.

3. The system-on-chip of claim 1, wherein the first slave device is configured to perform an access operation on the first address region in response to the first access request.

4. The system-on-chip of claim 1, wherein the safety memory protecting unit is further configured to report an error to the first master device in response to a case which the second access request is blocked.

5. The system-on-chip of claim 1, wherein each of the first slave ASIL, the second slave ASIL, and the first master ASIL is one of automotive safety integrity levels (ASIL) defined by an ISO 26262 standard.

6. The system-on-chip of claim 1, wherein each of the first access request and the second access request includes attribute information about the first master ASIL of the first master device.

7. The system-on-chip of claim 1, wherein the first access request is a first write request for the first address region, the second access request is a second write request for the second address region, wherein the first master device is further configured to output a first read request for the first address region and a second read request for the second address region, and wherein the safety memory protecting unit is further configured to receive the first read request and the second read request, and transfer the first read request and the second read request to the first slave device.

8. The system-on-chip of claim 1, further comprises:

an interconnect bus configured to receive the first access request and the second access request and transfer the first access request and the second access request to the safety memory protecting unit in response to a case in which the first master ASIL of the first master device is equal to or higher than the first slave ASIL of the first slave device.

9. The system-on-chip of claim 8, further comprises:

a second master device configured to output a third access request for the first address region and a fourth access request for the second address region, the second master device having a second master ASIL being different from the first master ASIL.

10. The system-on-chip of claim 9, wherein the interconnect bus is further configured to receive the third access request and the fourth access request from the second master device and block the third access request and the fourth access request in response to a case in which the second master ASIL is lower than the first slave ASIL of the first slave device.

11. The system-on-chip of claim 9, further comprises:

a safety function protection controller configured to output attribute information about the first slave ASIL of the first slave device, the first master ASIL of the first master device, and the second master ASIL of the second master device.

12. The system-on-chip of claim 8, further comprises a second slave device having a third slave ASIL, wherein the first master device is further configured to output a fifth access request for the second slave device, and the interconnect bus is further configured to receive the fifth access request from the first master device and block the fifth access request in response to a case in which the first master ASIL is lower than the third slave ASIL of the second slave device.

13. A system-on-chip comprising:

a first slave device having a first slave automotive safety integrity level (ASIL), the first slave device including a first address region having the first slave ASIL and a second address region having a second slave ASIL being higher than the first slave ASIL;

a first master device configured to output a first access request for the first slave device, the first master device having a first mater ASIL being lower than the first slave ASIL;

a second master device configured to output a second access request for the second address region of the first slave device, the second master device having a second master ASIL being lower than the second slave ASIL and being equal to or higher than the first slave level;

an interconnect bus configured to receive the first access request from the first master device, block the first access request in response to a case in which the first master safety ASIL is lower than the first salve ASIL, receive the second access request from the second master device, and output the second access request in response to a case in which the second master ASIL is equal to or higher than the first slave level;

a safety memory protecting unit configured to:

receive the first access request from the interconnect bus, and block the second access request in response to a case in which the second master ASIL is lower than the second slave ASIL.

14. The system-on-chip of claim 13, wherein the first slave device is a dynamic random access memory (DRAM) device.

15. The system-on-chip of claim 13, wherein the interconnect bus is further configured to report an error to the first master device in response to the first access request being blocked.

16. The system-on-chip of claim 13, wherein the safety memory protecting unit is further configured to report an error to the second master device in response to the second access request being blocked.

17. The system-on-chip of claim 13, wherein the second master is further configured to output a third access request for the first address region of the first slave device, wherein the interconnect bus is further configured to receive the third access request from the second master device and output the third access request in response to a case in which the second master ASIL is equal to or higher than the first slave level, and wherein the safety memory protecting unit is further configured to receive the third access request from the interconnect bus and transfer the third access request to the first slave device in response to the case in which the second master ASIL is equal to or higher than the first slave ASIL.

18. The system-on-chip of claim 13, wherein the first access request includes first attribute information about the first master ASIL and the second access request includes second attribute information about the second master ASIL.

19. An operation of a system-on-chip including a first master device, an interconnect bus, a safety memory protecting unit, and a first slave device, the method comprising:

providing, by the first master device having a first master automotive safety integrity level (ASIL), a first access request for a first address region of the first slave device, the first slave device having a first slave ASIL, and the first address region having a second slave ASIL;

transferring, by the interconnect bus, the first access request to the safety memory protecting unit in response to a case in which the first master ASIL is equal to or higher than the first slave ASIL of the first slave device; and blocking, by the safety memory protecting unit, the first access request in response to a case in which the first maser ASIL is lower than the second slave ASIL of the first address region.

20. The method of claim 19, further comprises:

providing, by the first master device having the first master ASIL, a second access request for a second address region of the first slave device, the second address region having the first slave ASIL;

transferring, by the interconnect bus, the second access request to the safety memory protecting unit in response to a case in which the first master ASIL is equal to or higher than the first slave ASIL of the first slave device;

transferring, by the safety memory protecting unit, the second access request in response to a case in which the first maser ASIL is equal to or higher than the first slave ASIL of the second address region; and performing, by the first slave device, an access operation on the second address region in response to the second access request.

* * * * *